United States Patent
Faurie

(10) Patent No.: US 9,848,421 B2
(45) Date of Patent: Dec. 19, 2017

(54) SYSTEMS AND METHODS FOR ENHANCED FLEXIBLE TIMESLOT ASSIGNMENT

(75) Inventor: Rene Faurie, Versailles (FR)

(73) Assignee: BlackBerry Limited, Waterloo, Ontario (CA)

( * ) Notice: Subject to any disclaimer, the term of this patent is extended or adjusted under 35 U.S.C. 154(b) by 162 days.

(21) Appl. No.: 13/592,826

(22) Filed: Aug. 23, 2012

(65) Prior Publication Data

US 2013/0051374 A1 Feb. 28, 2013

(30) Foreign Application Priority Data

Aug. 26, 2011 (EP) ..................................... 11306072

(51) Int. Cl.
 *H04W 72/04* (2009.01)
 *H04W 8/22* (2009.01)
(52) U.S. Cl.
 CPC .......... *H04W 72/0446* (2013.01); *H04W 8/22* (2013.01)
(58) Field of Classification Search
 CPC . H04J 3/1647; H04L 12/56; H04L 2012/5675
 USPC ........................................................ 370/337
 See application file for complete search history.

(56) References Cited

U.S. PATENT DOCUMENTS

| | | | | |
|---|---|---|---|---|
| 8,582,521 | B2 * | 11/2013 | Hole et al. | 370/329 |
| 2004/0151143 | A1 | 8/2004 | Abdesselem et al. | |
| 2009/0034506 | A1 | 2/2009 | Wijayanathan et al. | |
| 2009/0296665 | A1 * | 12/2009 | Provvedi et al. | 370/336 |
| 2010/0322204 | A1 | 12/2010 | Hole et al. | |
| 2011/0002231 | A1 * | 1/2011 | Hole et al. | 370/252 |
| 2011/0200019 | A1 * | 8/2011 | Manbo et al. | 370/336 |
| 2012/0020306 | A1 * | 1/2012 | Hole | H04W 72/042 370/329 |
| 2012/0033649 | A1 * | 2/2012 | Hole et al. | 370/336 |
| 2013/0121264 | A1 * | 5/2013 | Heo et al. | 370/329 |

FOREIGN PATENT DOCUMENTS

CA 2799455 A1 * 11/2011

OTHER PUBLICATIONS

Telefron AB LM Ericcson et al., "Interpretation of Multislot Class Parameters for EFTA," 3GPP Draft; GP-100341 CR 45 002-0144, Rel-9, 3rd Generation Partnership Project (3GPP), Mobile Competence Centre; 650m, Route Des Lucioles; F-06921 Sophia-Antipolis Cedex; France, vol. TSG GERAN, No. Berlin; Mar. 1, 2010, Feb. 25, 2010, XP050416680, [retrieved on Feb. 25, 2010] *paragraph [OB.4]—paragraph [OB.5]*.

(Continued)

*Primary Examiner* — Hassan Kizou
*Assistant Examiner* — Abdullahi Ahmed
(74) *Attorney, Agent, or Firm* — Fish & Richardson P.C.

(57) ABSTRACT

A mobile station in a communications system includes hardware and software stored on a tangible computer readable medium that, during operation, cause the mobile station to indicate one or more multislot classes for the mobile station to a device on a network. Parameters applicable to enhanced flexible timeslot assignment operation are determined based on the parameters of the one or more indicated multislot classes.

20 Claims, 13 Drawing Sheets

(56) References Cited

OTHER PUBLICATIONS

St-Ericcson: "New Test Case tc 58d.1.1," 3GPP Draft; GP-111048, 3rd Generation Partnership Project (3GPP), Mobile Competence Centre; 650, Route Des Lucioles; F-06921 Sophia-Antipolis Cedex; France, vol. TSG GERAN, No. Gothenburg; Aug. 29, 2011, Aug. 25, 2011, XP050536839, [retrieved on Aug. 25, 2011] *sentence 10, paragraph 58d.1.1.3—sentence 11*.
European Search Report, Application No. 11306072.7-1249, dated Feb. 28, 2012.
Search Report and Written Opinion for PCT/IB2012/054306, dated Mar. 29, 2013, 9 pages.
3GPP TS 45.002 V10.1.0 (May 2011), 3rd Generation Partnership Project; Technical Specification Group GSM/EDGE Radio Access Network; Multiplexing and multiple access on the radio path (Release 10), Jun. 17, 2011.
Communication Pursuant to Article 94(3) EPC issued in European Application No. 11306072.7 dated Jun. 27, 2016.
Extended European Search Report issued in European Application No. 17174448.5 on Oct. 11, 2017; 7 pages.

\* cited by examiner

| Parameter | Signaled MS class (s) | Alternative EFTA MS Class (a) | Applicable value (TS 45.002 Annex B.5) |
|---|---|---|---|
| Rx | Rx(sig)=5 | Rx(alt)=8 | Rx(alt) =8 |
| Tx | Tx(sig)=4 | Tx(alt)=4 | Tx(alt)=4 |
| Sum | Sum(sig)=6 | NA | NA |
| Tta | Tta(sig)=2 | Tta(alt)=2 | Tta(sig)=2 |
| Trb | Trb(sig)=1 | Trb(alt)=0-1 | Trb(alt)=0-1 |
| Tra | Tra(sig)=1 | Tra(alt)=2 | Tra(sig)=1 |
| Ttb | Ttb(sig)=1 | Ttb(alt)=0-1 | Ttb(alt)=0-1 |
| Patterned cells: selective applicability questioned ||||

FIG. 11

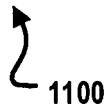

1100

| Parameter | Signaled multislot class | Alternative EFTA multislot class | Applicable value (TS 45.002 Annex B.5) |
|---|---|---|---|
| Rx | Rx(sig)=5 | Rx(alt)=8 | Rx(alt) =8 |
| Tx | Tx(sig)=5 | Tx(alt)=4 | Tx(alt)=4→5 |
| Sum | Sum(sig)=6 | NA | NA |
| Tta | Tta(sig)=2 | Tta(alt)=2 | Tta(sig)=2 |
| Trb | Trb(sig)=1 | Trb(alt)=0-1 | Trb(alt)=0-1 |
| Tra | Tra(sig)=1+to | Tra(alt)=2 | Tra(sig)=1+to |
| Ttb | Ttb(sig)=1-to | Ttb(alt)=0-1 | Ttb(alt)=0-1 |
| Patterned cells: selective applicability questioned ||||
| Ttb(sig)=1-to: switching time to be corrected for high multislot classes in existing 3GPP specifications ||||

FIG. 12

1200

| Parameter | Signaled multislot class | Alternative EFTA multislot class | Applicable value (TS 45.002 Annex B.5) |
|---|---|---|---|
| Rx | Rx(sig)=6 | Rx(alt)=8 | Rx(alt)=8 |
| Tx | Tx(sig)=6 | Tx(alt)=6 | Tx(alt)=6 |
| Sum | Sum(sig)=7 | NA | NA |
| Tta | Tta(sig)=1-to | Tta(alt)=2 | Tta(sig)=1-to |
| Trb | Trb(sig)=to | Trb(alt)=0-1 | Trb(sig)=to |
| Tra | Tra(sig)=1 | Tra(alt)=2 | Tra(sig)=1 |
| Ttb | Ttb(sig)=1 | Ttb(alt)=0-1 | Ttb(alt)=0-1 |
| Patterned cells: selective applicability questioned ||||
| Tta(sig)=1-to: switching time to be corrected for high multislot classes in existing 3GPP specifications ||||

FIG. 13
1300

| Parameter | Signaled multislot class | Applicable value (TS 45.002 Annex B.5) |
|---|---|---|
| Rx | Rx(sig)=5 | Rx(sig)=5 |
| Tx | Tx(sig)=4 | Tx(sig)=4 |
| Sum | Sum(sig)=6 | NA |
| Tta | Tta(sig)=2 | Tta(sig)=2 |
| Trb | Trb(sig)=1 | Trb(sig)=0-1 |
| Tra | Tra(sig)=1 | Tra(sig)=1 |
| Ttb | Ttb(sig)=1 | Ttb(sig)=0-1 |
| Patterned cells: selective applicability questioned |||

FIG. 14
1400

| Parameter | Signaled MS class | Applicable value (TS 45.002 Annex B.5) |
|---|---|---|
| Rx | *Rx(sig)=6* | Rx(sig)=6 |
| Tx | *Tx(sig)=6* | Tx(sig)=6 |
| Sum | *Sum(sig)=7* | NA |
| Tta | *Tta(sig)=1-to* | Tta(sig)=1-to |
| Trb | *Trb(sig)=to* | Trb(sig)=to |
| Tra | *Tra(sig)=1* | Tra(sig)=1 |
| Ttb | *Ttb(sig)=1* | Ttb(sig)=0-1 |
| Patterned cells: selective applicability questioned | | |

1500

SYSTEMS AND METHODS FOR ENHANCED FLEXIBLE TIMESLOT ASSIGNMENT

CROSS-REFERENCE TO RELATED APPLICATION

This application is based on and claims the benefit of priority from European Patent Application No. 11306072.7, filed on Aug. 26, 2011, the entire contents of which being incorporated herein by reference.

FIELD OF THE DISCLOSURE

The following relates to systems and methods for mobile communications.

BACKGROUND

The Global System for Mobile (GSM) communication system used in wireless telecommunications employs a time-division multiple access (TDMA) scheme. Such a system allows multiple users to share a same frequency channel by dividing the channel into different timeslots. Each timeslot, also referred to as a "slot" in the present disclosure, provides an available transmission time for a participant on the system. Thus, the participants transmit to and receive from a network in succession within their assigned timeslots.

For GSM, each system frequency is divided into eight timeslots collectively referred to as a frame or a TDMA frame. These timeslots and frames repeat in time and provide a framework for communications in both the uplink (from a mobile station or user equipment to a base station or network) and the downlink (from the base station or network to the mobile station or user equipment).

Developing universally-accepted telecommunication standards has been a goal at the forefront of the Third Generation Partnership Project (3GPP). One such development in recent years is the GSM/EDGE radio access network (GERAN) standard. Among many things, 3GPP GERAN dictates that a mobile station has a multislot class that determines the maximum number of timeslots the mobile station can use for transmission and reception within any given TDMA frame, and hence the maximum bandwidth that can be allocated to the mobile station in the uplink and downlink directions.

In different situations, the bandwidth needs of one direction may be far greater than in the other direction. In addition, the bandwidth needs in the uplink and the downlink may be subject to significant and recurrent variations, requiring flexible adjustment of timeslot assignments and allocation. Flexible Timeslot Assignment (FTA) and Enhanced Flexible Timeslot Assignment (EFTA) are features of GERAN respectively introduced in 3GPP GERAN Release 7 and Release 9. Both FTA and EFTA features address the need to permit greater flexibility with respect to bandwidth allocations between the uplink and the downlink.

BRIEF DESCRIPTION OF THE DRAWINGS

FIGS. 4A-4C are timing diagrams of uplink and downlink timeslots of a mobile station with signaled multislot class 33 and alternative EFTA multislot class 27.

FIGS. 5A-5C are timing diagrams of uplink and downlink timeslots of a mobile station with signaled multislot class 39 and alternative EFTA multislot class 27.

FIGS. 6A-6C are timing diagrams of uplink and downlink timeslots with signaled multislot class 45 and alternative EFTA multislot class 28.

FIG. 11 shows a table illustrating selective applicability of multislot capability for signaled class 33 and alternative class 27 as currently specified in 3GPP TS 45.002 Annex B.5.

FIG. 12 shows a table illustrating selective applicability of multislot capability for signaled class 39 and alternative class 27 as currently specified in 3GPP TS 45.002 Annex B.5.

FIG. 13 shows a table illustrating selective applicability of multislot capability for signaled class 45 and alternative class 28 as currently specified in 3GPP TS 45.002 Annex B.5.

FIG. 14 shows a table illustrating selective applicability of multi slot capability for signaled class 33 and no alternative class as currently specified in 3GPP TS 45.002 Annex B.5.

DESCRIPTION OF EXEMPLARY EMBODIMENTS

Reference will now be made in detail to exemplary embodiments, examples of which are illustrated in the accompanying drawings. Wherever possible, the same reference numbers will be used throughout the drawings to refer to the same or like parts.

Figure 1:
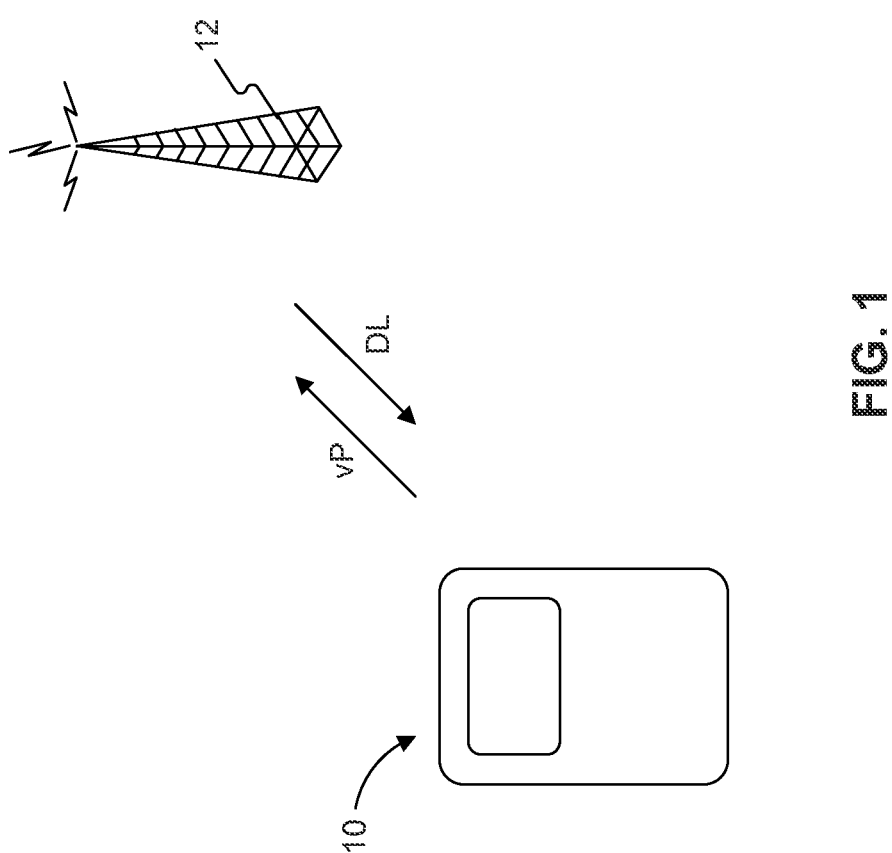
FIG. 1 is a block diagram illustrating a wireless communication system for implementing embodiments of the present disclosure.

FIG. 1 is a block diagram illustrating a wireless communication system. A mobile station 10 (e.g., MS) is shown communicating with a wireless base device 12. The mobile station 10 is able to exchange data and information with the base station 12 via uplink (UL) and downlink (DL) timeslots.

Figure 2:
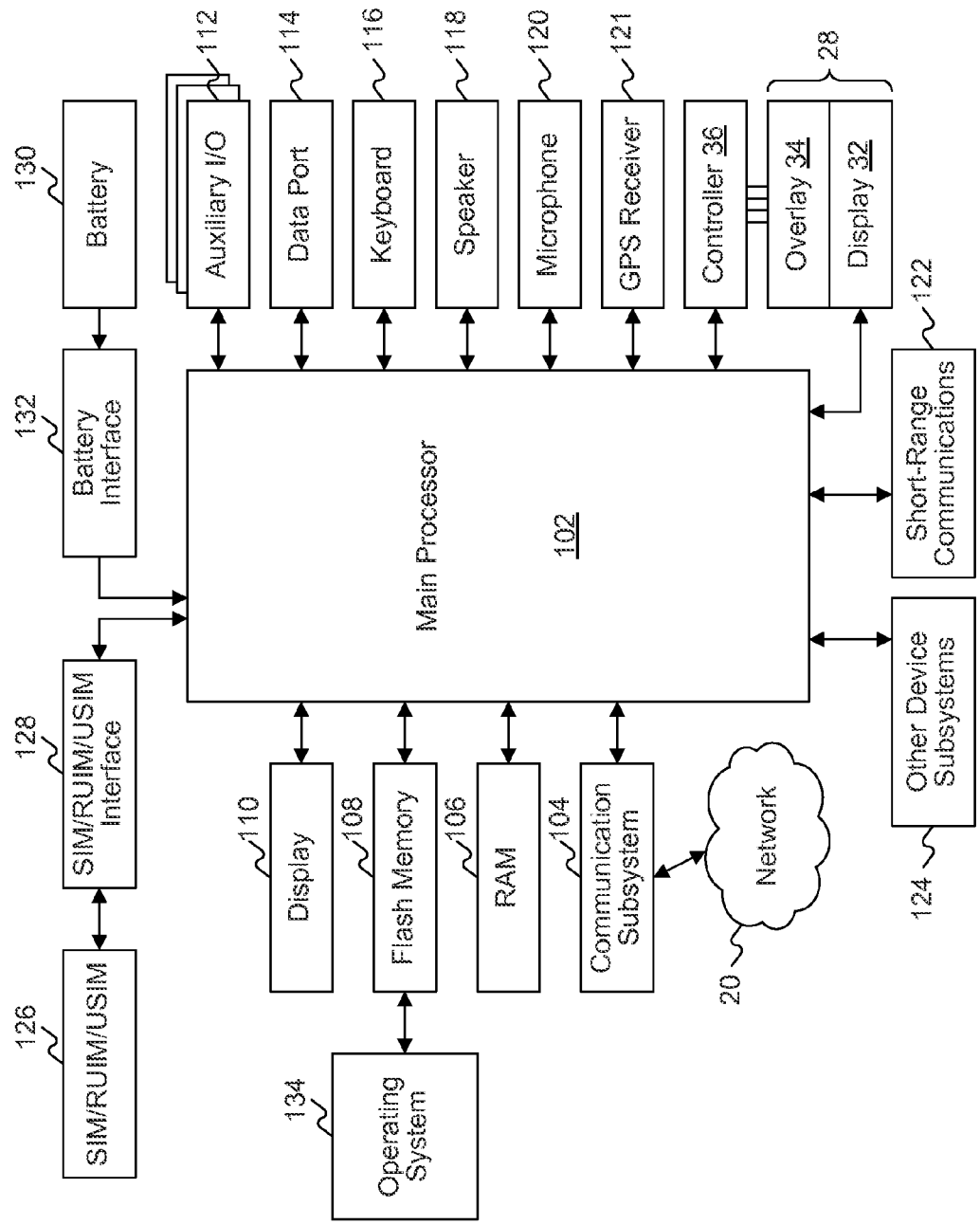
FIG. 2 is a block diagram illustrating an exemplary embodiment of a mobile station.

FIG. 2 illustrates an exemplary configuration for the mobile station 10. Referring first to FIG. 2, shown therein is a block diagram of an exemplary embodiment of a mobile station 10. The mobile station 10 comprises a number of components such as a main processor 102 that controls the overall operation of the mobile station 10. Communication functions, including data and voice communications, are performed through a communication subsystem 104. The communication subsystem 104 receives data from and sends data to a wireless network 20. In this exemplary embodiment of the mobile station 10, the communication subsystem 104 is configured in accordance with the GSM and GPRS standards, which are used worldwide. Other communication configurations that are equally applicable are, for example, Evolved EDGE or EDGE Evolution. The wireless link connecting the communication subsystem 104 with the wireless network 20 represents one or more different Radio Frequency (RF) channels.

The main processor 102 also interacts with additional subsystems such as a Random Access Memory (RAM) 106, a flash memory 108, a display 110, an auxiliary input/output (110) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol reconfigured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile station 10 perform communication-related functions, whereas other subsystems may provide "resident" or on-device functions. By way of example, the display 110 and the keyboard 116 may be used for both communication-related functions, such as entering a text message for transmission over the network 20, and device resident functions such as a calculator or task list.

The mobile station 10 can send and receive communication signals over the wireless network 20 after required network registration or activation procedures have been completed. Network access is associated with a subscriber or user of the mobile station 10. To identify a subscriber, the mobile station 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile station 10 is not fully operational for communication with the wireless network 20. Once the SIM/RUIM/USIM 126 is inserted into the SIM/RUIM/USIM interface 128, it is coupled to the main processor 102.

The mobile station 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile station 10. Although current technology makes use of a battery, future technologies such as micro fuel cells may provide the power to the mobile station 10.

The mobile station 10 also includes an operating system 134 including software components. The operating system 134 and its software components are executed by the main processor 102 are typically stored in a persistent store such as the flash memory 108, which may alternatively be a read-only memory (ROM) or similar storage element. Those skilled in the art will appreciate that portions of the operating system 134 and its software components may be temporarily loaded into a volatile store such as the RAM 106.

Although FIG. 2 illustrates an exemplary configuration for the mobile station 10, in alternative implementations, those skilled in the art will appreciate that the components of mobile station 10 may be capable of performing functions associated with other components of mobile station 10.

Figure 3:
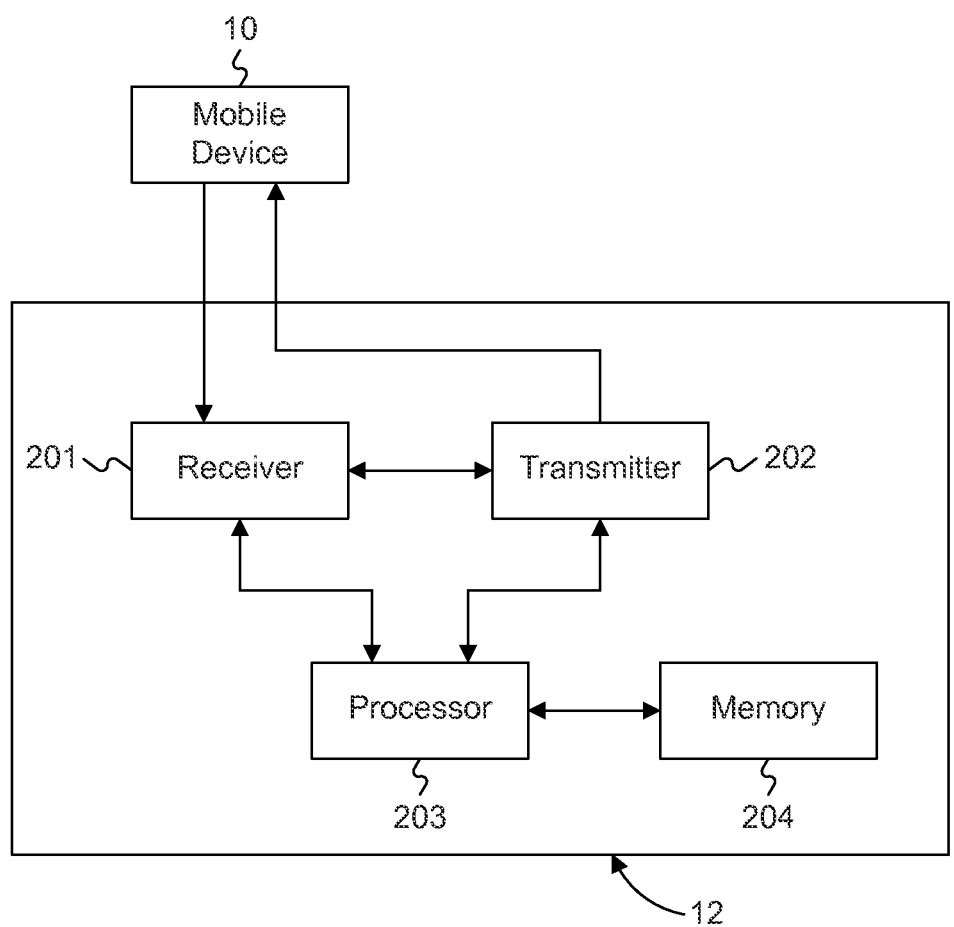
FIG. 3 is a block diagram illustrating a base device in communication with a mobile station.

FIG. 3 is a block diagram illustrating a base station 12. In order to communicate with mobile station 10, base station 12 includes a receiver 201 and transmitter 202 connected to a processor 203. The processor 203 is configured to perform various functions including determining downlink configurations, obtaining multislot classes of mobile stations, assigning or allocating uplink timeslots, etc. The processor 203 is also configured to perform other functions such as device control, input/output, and other data processing related functions. It is noted that the processor 203 may be located outside of the base station 12 in a separate entity on the network 20. Base station 12 may include memory device 204 in communication with the processor 203. Memory device 204 may random-access memory (RAM), dynamic random-access memory (DRAM), or similar storage element.

Although FIG. 3 illustrates an exemplary configuration for the base station 12, in alternative implementations, those skilled in the art will appreciate that the components of base station 12 may be capable of performing functions associated with other components of base station 12.

The examples and embodiments provided below describe various methods and systems for providing enhanced flexible timeslot assignment and allocation to a mobile station and, in some embodiments, for the operation of a network or mobile station in accordance with such assignments and/or allocations, such as 10 used in a TDMA communication network such as GSM. As known to those of ordinary skill in the art, multislot capability of a mobile station defines the maximum number of timeslots (up to 8 timeslots in each of uplink and downlink) of a TDMA frame that a mobile station is able to use for receiving in downlink (Rx) or transmitting in uplink (Tx). The multislot capability also indicates the maximum sum (SUM) of the transmit and receive timeslots that a mobile station can support within a given TDMA frame. It also indicates the minimum time required for the mobile to switch from transmit to receive operation (Tra or Trb), and from receive to transmit (Tta or Ttb), including the case where some measurements may need to be carried out within one (at most) of the two switching times (in which case either Tra or Tta is applicable, otherwise Trb or Ttb is applicable instead).

Examples of how a mobile station may operate in accordance with these parameters include the following: i) the mobile station may reject or ignore an assignment of resources that do not comply with the parameters or may, in response, perform appropriate subsequent actions such as retransmitting a request for resources; ii) it may schedule transmissions of uplink bursts (including those corresponding to poll responses) or the reception of downlink bursts in accordance with the parameters e.g. by ensuring that the gap between transmission and subsequent reception (or vice versa) is in accordance with the applicable switching time, which may allow for measurement of an aspect of a (non-serving) cell; in particular, it may omit to transmit or receive bursts on timeslots which have been allocated to it (in the uplink case, whether by means of an uplink state flag (USF) or a poll) or (in the downlink case) may have been allocated to it i.e. may be used for transmissions addressed to the mobile station; iii) it may set or configure other parameters (such as radio link control window size or radio link control buffer size) according to its parameters, or iv) it may utilize features, capabilities or techniques (for example, shifted USF, the use of certain modulations schemes or the use of features which are applicable to or supported by mobile stations based on their respective parameters) appropriate to the determined parameters.

Similarly, the network may operate in accordance with the parameters determined in respect of a particular mobile station by i) ensuring that multislot assignments or allocations comply with the determined parameters; ii) by requiring or utilizing features, capabilities or techniques (for example, shifted USF, the use of certain modulations schemes or the use of features which are applicable to or supported by mobile stations based on their respective parameters) appropriate to the determined parameters; or iii) by determining the mobile station's schedule for data reception based on observation of its transmissions. Note that details of how the network or mobile station operates in accordance with the determined parameters may vary according to various factors, such as the medium access control protocol applicable or the capabilities or features of the mobile station or network that are being used (for example, whether flexible timeslot assignment is applicable to an assignment) and further specific examples may be described below in one or more of the described embodiments. In particular, in some embodiments, the mobile station takes account of requirements to transmit in a given radio block period uplink data or control messages to determine on which, if any, allocated timeslots it transmits.

One feature closely related to mobile station switching capabilities is the Timing Advance (TA) offset. By this mechanism, the base station offsets (advances) its receive (i.e. corresponding to uplink) timebase relative to its transmit (i.e. the downlink) timebase, which results in a minimum timing advance value (the offset is of 31 symbol periods—see 3GPP TS 45.002 Annex B.1) for the mobile station. This enables a mobile station supporting this capability to switch between transmit and receive operations in less time than would otherwise be the case. Mobile stations which can take advantage of such a mechanism may support switching times such as to, 1−to or 1+to ('1' standing for one timeslot duration).

The parameters described above (switching times, SUM, Rx, Tx, etc.) are typically communicated to the network in the form of a multislot class parameter. As such, a single multislot class parameter may permit the network to determine the various parameters applicable to the mobile station and hence (or otherwise directly) take into account the capabilities and applicable parameters in subsequent assignments, allocations, etc. Generally, multislot classes specified for full duplex operation (i.e. where the mobile station both transmits and receives during a given TDMA frame), in particular classes 30-45, indicate self-consistent parameters, in particular, such that SUM+(one each of receive-to-transmit and transmit-to-receive switching times) is no greater than 8 timeslots. A mobile station may indicate various multislot classes, applicable respectively to different capabilities or configurations, e.g. one multislot class for Enhanced General Packet Radio Service (EGPRS) configurations, and a different one for dual transfer mode (DTM) operations. Currently, as described below, parameters applicable to EFTA operation may be determined based on one or both of a multislot class and an alternative multislot class. Signaling of the multislot class(es) to the network is typically by means of the Mobile Station Radio Access Capabilities information element (IE) (see 3GPP TS 24.008) transmitted by the mobile station to a network entity. A radio access network entity (such as processor 203) may receive them indirectly, from a core network entity or directly from the mobile station. The presence of a particular multislot class indication may imply support for a corresponding feature. Similarly, indication of a particular multislot class (corresponding to a set of parameters) may imply support for a particular feature or capability, such as one that may be required to benefit from low switching times and/or support for high numbers of receive and/or transmit timeslots. Further indications may indicate a replacement or adjustment to one or more parameters derived from a multislot class, such as a reduction in the number of receive timeslots when a particular feature, e.g. downlink dual carrier is being used.

As also known to those of ordinary skill in the art, timeslots within a TDMA system may be assigned and allocated. In this context, assignment refers to the set of timeslots that are made available (by means of signaling such as by an assignment message) to a given mobile station. Allocation refers to the set of timeslots selected dynamically (e.g. on a radio block-by-radio block basis) for the use of a particular mobile station. Multiple mobile stations can share the same or overlapping assignments, and allocation can be used to avoid collisions.

Since it is generally desirable to be able to allocate timeslots over multiple frames, assignments are typically valid over multiple TDMA frames. Such assignment is referred to as temporary block flow (TBF). A TBF is unidirectional. An uplink TBF relates to uplink assignment/allocation, and a downlink TBF relates to downlink assignment/allocation. The timeslot numbering for the uplink is offset from the timeslot numbering for the downlink such that a mobile station can receive on a downlink timeslot and transmit on the uplink timeslot with the same number in the same TDMA frame without requiring the mobile station to receive and transmit at the same time.

For downlink allocation, after assignment, the network transmits using some or all of the assigned timeslots. Each mobile station that receives signals from the network on the downlink timeslots assigned to it can determine whether there is any content addressed to itself, meaning that those particular timeslots were allocated to the mobile station. All, a subset, or none of the timeslots assigned to a mobile station may be allocated to the mobile station in a given frame.

For uplink allocation, a mechanism is employed based on an uplink state flag (USF) for allocating uplink radio blocks to different mobile stations sharing the same uplink packet data channel(s) (PDCH(s)).

The techniques and embodiments of the present disclosure are generally described for a Basic Transmission Time Interval (BTTI) configuration, i.e. a configuration in which a radio block is transmitted using one packet data channel (PDCH) in each of four consecutive TDMA frames (i.e., within a duration of about 20 ms). However, those skilled in the art will appreciate that similar techniques and embodiments would similarly apply to a Reduced Transmission Time Interval (RTTI) configuration, i.e. a configuration in which a radio block is transmitted using a pair of PDCHs in each of two consecutive TDMA frames (i.e., within a duration of about 10 ms). Likewise, the techniques and embodiments in the present disclosure are generally described for a single carrier configuration, while they would similarly apply for a downlink dual carrier configuration.

A first example of uplink allocation that can be employed is referred to as dynamic allocation (DA), which is a medium access control (MAC) medium access mode. Using DA, to allocate an uplink radio block, a USF contained in a radio block transmitted by the network in a downlink timeslot in a given radio block period is used to allocate a radio block using the corresponding uplink timeslot in the next radio block period, or in the next four radio block periods depending on the value of a USF granularity parameter (e.g. "USF_GRANULARITY") signaled by the network to the mobile station. With conventional DA, the corresponding uplink timeslot has the same number as the downlink timeslot in which the downlink radio block containing the USF is received.

Extended dynamic allocation (EDA) is another MAC medium access mode. With EDA, for an uplink TBF, a USF contained in a downlink radio block transmitted by the network in a given downlink timeslot means that the uplink timeslot having the same number as the given downlink timeslot and all assigned uplink timeslots with higher timeslot numbers than that timeslot are being allocated for block transmission in the next radio block period. In some embodiments, a variant of conventional EDA may be employed in which the corresponding uplink timeslot can be an uplink timeslot having an uplink timeslot number that is the same or different from the downlink timeslot number of the timeslot in which the downlink radio block containing the USF is received. Such variant may e.g. use the shifted USF technique.

Without any type of Flexible Timeslot Assignment, the set of timeslots assigned by a base station to downlink and uplink of a mobile station must comply with the mobile station's capability. For example, for a class 33 device (Rx=5; Tx=4; SUM=6), an assignment which defines the number of timeslots in downlink and uplink being 4 (d) and 2 (u) respectively is acceptable. In this scenario, Rx is the maximum number of receive timeslots the mobile station can use per TDMA frame, Tx is the maximum number of transmit timeslots the mobile station can use per TDMA frame, and SUM is the maximum total number of uplink (u) and downlink (d) timeslots that can be used by the mobile station per TDMA frame.

With EFTA, as defined in 3GPP GERAN specifications, the assignment and the actual allocation of downlink and uplink timeslots do not have to comply with the SUM parameter of the mobile station. One EFTA rule states that uplink transmissions are prioritized by the mobile station over the reception of downlink transmission. Thus, a mobile station that has data to transmit uses some or all allocated uplink timeslots and monitors as many of its assigned downlink timeslots as possible. This EFTA feature allows a mobile station to receive downlink data on downlink timeslots that it would not have been able to receive had it been transmitting.

In other words, compared to non-EFTA cases, where the mobile station may be allocated uplink resources that it has no need for, in which case the mobile station cannot receive any downlink data due to the requirement that all allocations must comply with the multislot capabilities of the mobile station, an EFTA-enabled device may monitor the downlink, and hence potentially receive downlink data, when no uplink block has to be transmitted, regardless of the uplink allocation. This EFTA feature is applicable only to mobile stations which belong to high multislot classes 30-45 (that is, whose "signaled" or "native" multislot class is in the range 30-45 inclusive) (the high multislot class of a mobile station capable of EFTA is also called "native" EFTA multislot class in the present description or "signaled" multislot class) under 3GPP TS 45.002 Annex B.1, reproduced in Table 1 below.

TABLE 1

Classes for Multislot Capability from 3GPP 45.002 Annex B.1

| Multislot class | Maximum number of slots | | | Minimum number of slots | | | | Type |
|---|---|---|---|---|---|---|---|---|
| | Rx | Tx | Sum | $T_{ta}$ | $T_{tb}$ | $T_{ra}$ | $T_{rb}$ | |
| 1 | 1 | 1 | 2 | 3 | 2 | 4 | 2 | 1 |
| 2 | 2 | 1 | 3 | 3 | 2 | 3 | 1 | 1 |
| 3 | 2 | 2 | 3 | 3 | 2 | 3 | 1 | 1 |
| 4 | 3 | 1 | 4 | 3 | 1 | 3 | 1 | 1 |
| 5 | 2 | 2 | 4 | 3 | 1 | 3 | 1 | 1 |
| 6 | 3 | 2 | 4 | 3 | 1 | 3 | 1 | 1 |
| 7 | 3 | 3 | 4 | 3 | 1 | 3 | 1 | 1 |
| 8 | 4 | 1 | 5 | 3 | 1 | 2 | 1 | 1 |
| 9 | 3 | 2 | 5 | 3 | 1 | 2 | 1 | 1 |
| 10 | 4 | 2 | 5 | 3 | 1 | 2 | 1 | 1 |
| 11 | 4 | 3 | 5 | 3 | 1 | 2 | 1 | 1 |
| 12 | 4 | 4 | 5 | 2 | 1 | 2 | 1 | 1 |
| 13 | 3 | 3 | NA | NA | a) | 3 | a) | 2 |
| 14 | 4 | 4 | NA | NA | a) | 3 | a) | 2 |
| 15 | 5 | 5 | NA | NA | a) | 3 | a) | 2 |
| 16 | 6 | 6 | NA | NA | a) | 2 | a) | 2 |
| 17 | 7 | 7 | NA | NA | a) | 1 | 0 | 2 |
| 18 | 8 | 8 | NA | NA | 0 | 0 | 0 | 2 |
| 19 | 6 | 2 | NA | 3 | b) | 2 | c) | 1 |
| 20 | 6 | 3 | NA | 3 | b) | 2 | c) | 1 |
| 21 | 6 | 4 | NA | 3 | b) | 2 | c) | 1 |
| 22 | 6 | 4 | NA | 2 | b) | 2 | c) | 1 |
| 23 | 6 | 6 | NA | 2 | b) | 2 | c) | 1 |
| 24 | 8 | 2 | NA | 3 | b) | 2 | d) | 1 |
| 25 | 8 | 3 | NA | 3 | b) | 2 | d) | 1 |
| 26 | 8 | 4 | NA | 3 | b) | 2 | d) | 1 |
| 27 | 8 | 4 | NA | 2 | b) | 2 | d) | 1 |
| 28 | 8 | 6 | NA | 2 | b) | 2 | d) | 1 |
| 29 | 8 | 8 | NA | 2 | b) | 2 | d) | 1 |
| 30 | 5 | 1 | 6 | 2 | 1 | 1 | 1 | 1 |
| 31 | 5 | 2 | 6 | 2 | 1 | 1 | 1 | 1 |
| 32 | 5 | 3 | 6 | 2 | 1 | 1 | 1 | 1 |
| 33 | 5 | 4 | 6 | 2 | 1 | 1 | 1 | 1 |
| 34 | 5 | 5 | 6 | 2 | 1 | 1 | 1 | 1 |
| 35 | 5 | 1 | 6 | 2 | 1 | 1 + to | 1 | 1 |
| 36 | 5 | 2 | 6 | 2 | 1 | 1 + to | 1 | 1 |
| 37 | 5 | 3 | 6 | 2 | 1 | 1 + to | 1 | 1 |
| 38 | 5 | 4 | 6 | 2 | 1 | 1 + to | 1 | 1 |
| 39 | 5 | 5 | 6 | 2 | 1 | 1 + to | 1 | 1 |
| 40 | 6 | 1 | 7 | 1 | 1 | 1 | to | 1 |
| 41 | 6 | 2 | 7 | 1 | 1 | 1 | to | 1 |
| 42 | 6 | 3 | 7 | 1 | 1 | 1 | to | 1 |
| 43 | 6 | 4 | 7 | 1 | 1 | 1 | to | 1 |
| 44 | 6 | 5 | 7 | 1 | 1 | 1 | to | 1 |
| 45 | 6 | 6 | 7 | 1 | 1 | 1 | to | 1 | a) = 1 with frequency hopping.
 = 0 without frequency hopping.
b) = 1 with frequency hopping or change from Rx to Tx.
 = 0 without frequency hopping and no change from Rx to Tx.
c) = 1 with frequency hopping or change from Tx to Rx.
 = 0 without frequency hopping and no change from Tx to Rx.
d) = 1 change from Tx to Rx, or with frequency hopping and the MS does not support fast downlink frequency switching (see 3GPP TS 24.008).
 = 0 no change from Tx to Rx and either without frequency hopping or the MS supports fast downlink frequency switching (see 3GPP TS 24.008).
to = 31 symbol periods (this can be provided by a TA offset, i.e. a minimum TA value).

For mobile stations that are not required to transmit and receive at the same time, 3GPP 45.002, Table 6.4.2.2.1 lists the number of timeslots that are possible to assign, and is reproduced in Table 2 below.

TABLE 2

Multislot configurations for packet switched connections in A/Gb mode from 3GPP45.002, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| Downlink, any mode | d = 1-6 | Yes | — | 1-12, 19-45 | |
| | d = 7-8 | No | — | 24-29 | 1, 2 |
| Uplink, Dynamic | u = 1-2 | Yes | — | 1-12, 19-45 | 10 |
| | u = 2 | — | Yes | 12, 36-39 | 11 |
| | u = 3 | | Yes | 12, 37-39 | 9 |
| | u = 2-3 | Yes | — | 31-34, 41-45 | 9 |
| Uplink, Ext. Dynamic | u = 1-3 | Yes | — | 1-12, 19-45 | |
| | u = 4 | — | Yes | 12, 22-23, 27-29 | 2 |
| | u = 4 | Yes | — | 33-34, 38-39, 43-45 | 2 |
| | u = 5 | Yes | — | 34, 39 | 2, 3, 5 |
| | u = 5 | — | Yes | 44-45 | 2, 4 |
| | u = 4 | Yes | — | 30-39 | 12 |
| | u = 4 | — | Yes | 40-45 | 12 |
| | u = 5 | Yes | — | 30-39 | 5, 12 |
| | u = 5 | — | Yes | 40-45 | 5, 12 |
| | u = 6 | — | Yes | 45 | 2, 4, 5 |
| Down + up, Dynamic | d + u = 2-5, u < 3 | Yes | — | 1-12, 19-45 | 10 |
| | d + u = 6, u < 3 | Yes | — | 30-45 | 2, 3 |
| | d + u = 7, u < 3 | — | Yes | 40-45 | 2, 4 |
| | d = 2, u = 3 | Yes | — | 32-34, 42-45 | 9 |
| | d + u = 5, u = 2-3 | — | Yes | 12, 36-39 | 9 |
| | d + u = 6, u = 3-4 | Yes | — | 32-34, 37-39, 42-45 | 2, 3, 9 |
| | d + u = 7, u = 3-4 | — | Yes | 42-45 | 2, 4, 9 |
| | d = 4, u = 4 | Yes | — | 33-34, 38-39, 43-45 | 2, 3, 8, 9 |
| | d = 4, u = 5 | — | Yes | 44-45 | 2, 4, 8, 9 |
| | d + u = 8-10, u < 3 | Yes | — | 30-45 | 12 |
| Down + up, Ext. Dynamic | d + u = 2-4 | Yes | — | 1-12, 19-45 | |
| | d + u = 5, d > 1 | Yes | — | 8-12, 19-45 | |
| | d + u = 6-7, u < 4 | Yes | — | 10-12 | 8 |
| | d = 1, u = 4 | — | Yes | 12, 22-23, 27-29 | 2 |
| | d > 1, u = 4 | — | Yes | 12 | 2, 8 |
| | d = 1, u = 4 | Yes | — | 33-34, 38-39, 43-45 | 2, 6 |
| | d + u = 6, d > 1 | Yes | — | 30-45 | 2, 3 |
| | d = 1, u = 5 | Yes | — | 34, 39 | 2, 3, 5 |
| | d + u = 7-9, u < 5 | Yes | — | 31-34, 36-39 | 2, 3, 8 |
| | d > 1, u = 5 | Yes | — | 34, 39 | 2, 3, 5, 8 |
| | d = 1, u = 5 | — | Yes | 44-45 | 2, 4 |
| | d + u = 7, d > 1 | — | Yes | 40-45 | 2, 4 |
| | d = 1, u = 6 | — | Yes | 45 | 2, 4, 5 |
| | d + u = 8-11, u < 6 | — | Yes | 41-45 | 2, 4, 8 |
| | d > 1, u = 6 | — | Yes | 45 | 2, 4, 5, 8 |
| | d + u = 2-16 u = 1-4 | Yes | — | 30-39 | 12 |
| | d + u = 6-16 u > 4 | Yes | — | 30-39 | 5, 12 |
| | d + u = 2-16 u = 1-4 | — | Yes | 40-45 | 12 |

TABLE 2-continued

Multislot configurations for packet switched connections in A/Gb mode from 3GPP45.002, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| | d + u = 6-16 u > 4 | — | Yes | 40-45 | 5, 12 |

Note 0 If the downlink timeslots assigned (allocated) to the mobile station are not contiguous, d shall also include the number of downlink timeslots not assigned (allocated) to the mobile station that are located between assigned (allocated) downlink timeslots. Similarly, if the uplink timeslots assigned (allocated) to the mobile station are not contiguous, u shall also include the number of uplink timeslots not assigned (allocated) to the mobile station that are located between assigned (allocated) uplink timeslots.
Note 1 Normal measurements are not possible (see 3GPP TS 45.008).
Note 2 Normal BSIC decoding is not possible (see 3GPP TS 45.008) except e.g. in case of a downlink dual carrier capable MS operating in single carrier mode using its second receiver for BSIC decoding.
Note 3 TA offset required for multislot classes 35-39.
Note 4 TA offset required for multislot classes 40-45.
Note 5 Shifted USF operation shall apply (see 3GPP TS 44.060).
Note 6 The network may fallback to a lower multislot class and may not apply $T_{ra}$. A multislot class 38 or 39 MS shall in this case use $T_{ta}$ for timing advance values below 31.
Note 7 For dual carrier operation the Applicable Multislot class is the Signalled multislot class or the Equivalent multislot class (if different from the Signalled multislot class) as defined in Table B.2. For EFTA operation the Applicable Multislot class is the Signalled multislot class.
Note 8 These configurations can only be used for assignment to an MS supporting Flexible Timeslot Assignment (see 3GPP TS 24.008). For allocation additional restrictions apply.
Note 9 These configurations can be used only in RTTI configuration.
Note 10 These configurations can be used in RTTI configurations only when the timeslots of the corresponding downlink PDCH-pair are contiguous.
Note 11 These configurations can be used only in RTTI configurations when the timeslots of the corresponding downlink PDCH-pair are not contiguous.
Note 12 These configurations can only be used for assignment to an MS for which Enhanced Flexible Timeslot Assignment is used (see 3GPP TS 44.060). Whether normal measurements (see 3GPP TS 45.008) and/or normal BSIC decoding (see 3GPP TS 45.008) are possible will be dependent of allocation.

In addition to their native EFTA multislot class, EFTA-capable mobile stations may also indicate an alternative EFTA multislot class from one of classes 19-29. Additional information regarding the alternative EFTA multislot class may be found at 3GPP 45.002 Annex B.5 and 3GPP TS 24.008 10.5.5.12a. A purpose of an alternative EFTA multislot class is to allow support for more uplink or downlink timeslots than is allowed for the native EFTA multislot class (which may support up to 6 uplink or downlink timeslots depending on the multislot class). Multislot classes 19-29, also referred to as half-duplex multislot classes in the present description, as their associated multislot capabilities would allow the support of a fixed allocation half duplex mode of operation (see e.g. 3GPP TS 44.060 Release 1999 sub-clause 8.1.1.3—noting that fixed allocation support was removed from Release 5 onwards from the 3GPP specifications), allow indication of support for up to 8 uplink or downlink timeslots.

The multislot capability parameters of an EFTA mobile station depend on the native EFTA multislot class parameters and on the alternative EFTA multislot class parameters. Again, 3GPP 45.002 Annex B.5 provides the rules for deriving the multislot capability parameters applicable to EFTA operation. In the present disclosure, these rules may be referred to as the selective applicability of multislot capability parameters for EFTA. Table B.3 of Annex B.5 is reproduced in Table 3 below.

TABLE 3

Multislot Capability Parameters from 3GPP 45.002 Annex B.5

| Signaled multislot class | Alternative EFTA multislot class | Rx | Tx | Sum | $T_{ta}$ | $T_{tb}$ | $T_{ra}$ | $T_{rb}$ |
|---|---|---|---|---|---|---|---|---|
| 30-39 | None | sig | sig | NA | sig | b) | sig | c) |
| | 19 | 6 | 2 | NA | sig | b) | sig | c) |

TABLE 3-continued

Multislot Capability Parameters from 3GPP 45.002 Annex B.5

| Signaled multislot class | Alternative EFTA multislot class | Rx | Tx | Sum | $T_{ta}$ | $T_{tb}$ | $T_{ra}$ | $T_{rb}$ |
|---|---|---|---|---|---|---|---|---|
| | 20 | 6 | 3 | NA | sig | b) | sig | c) |
| | 21-22 | 6 | 4 | NA | sig | b) | sig | c) |
| | 23 | 6 | 6 | NA | sig | b) | sig | c) |
| | 24 | 8 | 2 | NA | sig | b) | sig | d) |
| | 25 | 8 | 3 | NA | sig | b) | sig | d) |
| | 26-27 | 8 | 4 | NA | sig | b) | sig | d) |
| | 28 | 8 | 6 | NA | sig | b) | sig | d) |
| | 29 | 8 | 8 | NA | sig | b) | sig | d) |
| 40-45 | None | sig | sig | NA | sig | b) | sig | sig |
| | 19 | 6 | 2 | NA | sig | b) | sig | sig |
| | 20 | 6 | 3 | NA | sig | b) | sig | sig |
| | 21-22 | 6 | 4 | NA | sig | b) | sig | sig |
| | 23 | 6 | 6 | NA | sig | b) | sig | sig |
| | 24 | 8 | 2 | NA | sig | b) | sig | sig |
| | 25 | 8 | 3 | NA | sig | b) | sig | sig |
| | 26-27 | 8 | 4 | NA | sig | b) | sig | sig |
| | 28 | 8 | 6 | NA | sig | b) | sig | sig |
| | 29 | 8 | 8 | NA | sig | b) | sig | sig | sig = Parameter value should be taken from the signaled multislot class b), c) and d) are as defined in subclause B.1.
d) at Rx to Rx transition without frequency hopping then $T_{ra}/T_{rb} = 0$ As discussed previously, an EFTA capable device such as mobile station 10 or 100 may indicate an alternative EFTA multislot class (selected from half-duplex multislot classes 19-29) for the purpose of supporting a higher number of downlink and uplink timeslots. This may be beneficial for supporting more downlink timeslots, since EFTA-enabled devices may monitor the downlink when there are no uplink blocks to transmit. However, using alternative EFTA multislot classes for indicating the support a higher number of uplink timeslots may not be advantageous as currently specified, or the operation of certain resulting multislot configurations may not be supported by existing 3GPP specifications. The following example of mobile station with a signaled multislot class 32 and an alternative EFTA multislot class demonstrates some drawbacks in the existing approach.

A multislot configuration with a number of uplink timeslots (i.e., "u") equal to 1, 2, or 3 is possible with multislot class 32 and does not require the support of an alternative EFTA multislot class.

A multislot configuration with u=4 is not supported by multislot class 32 as u is greater than the value of the Tx capability parameter, i.e. Tx=3. This configuration would be indicated as being possible with a number of half duplex multislot classes (e.g. 22-23, 27-29) (in which case EDA and Tta would be applicable according to current specifications). However, a mobile station basically supporting 4 uplink timeslots could have (and, reasonably, would have) signaled a native multislot class 33 (Rx=5, Tx=4, SUM=6) instead of class 32, therefore indicating an alternative EFTA multislot class is not considered to be an essential benefit in this respect.

A multislot configuration with u=5 is supported by high multislot classes 34, 39, 44 or 45, either by using shifted USF (wherein the USF for the first assigned uplink timeslot is sent on the downlink timeslot corresponding to, i.e. with the same timeslot number as, the second assigned uplink timeslot for the purpose of increasing uplink capacity) or without using shifted USF, by using a timing advance (TA) offset. However, neither class 32 nor half duplex multislot classes (e.g. 29) are expected to support these mechanisms and the relevant multislot capability parameters (e.g. lower switching times) evidenced by 3GPP 45.002, table 6.4.2.2.1 and table B.1. Hence u=5 is a configuration that is not consistent with the support (or lack thereof) of such mechanisms currently applicable to either the signaled multislot class or any of the possible alternative EFTA multislot classes. In some embodiments consistent with this disclosure, the support of the relevant mechanisms is enforced and the relevant capabilities applied in the case of EFTA.

It should be noted that there is no half-duplex class with Tx=5 capability (allowed values being 8, 6, 4, etc.). Therefore, a mobile station indicating an alternative EFTA multislot class for the purpose of supporting u=5 configurations would need to at least support Tx=6, for which the use of both Shifted USF and timing advance offset are required. Thus, in accordance with some embodiments, considering that i) the purpose of signaling an alternative EFTA multislot class is to increase the multislot capability, and ii) the parameters applicable to EFTA operation may be determined based on one or both of a signaled (Sig) multislot class and an alternative (Alt) multislot class, the applicable rule for determining the Rx parameter is defined as the larger value of Rx(Sig) and Rx (Alt), and the applicable rule for determining the Tx parameter is defined as the larger value of Tx(Sig) and Tx (Alt). Thus, a mobile station of a signaled multislot class 34, 39, or 44 (supporting up to Tx=5 uplink timeslots) is able to signal an increased downlink capability through the use of an alternative EFTA multislot class having a lower transmit capability without altering its native transmit capability.

Similar to when u=5, a multislot configuration with u=6 is not possible due to the absence of support for Shifted USF and the timing advance offset applicable to the signaled class (multislot classes 32) and the alternative multislot class (i.e. any of multislot classes 19-29)—see 3GPP TS 45.002 Table 6.4.2.2.1. Thus, in accordance with some embodiments, a number of multislot capability parameters are redefined to allow support for this configuration. Specifically, the support of the shifted USF and timing advance offset mechanisms are enforced and the applicability of relevant capabilities is specified in the case of EFTA independent of the current requirements applicable to their support for the native multislot class and for the alternative EFTA multislot class.

A multislot configuration with u=7 or 8 would have been supported with a fixed allocation medium access mode operated in half duplex mode, but the fixed allocation medium access mode is no longer supported by 3GPP specifications (it was removed from Release 5), and multislot configurations with u=7 or 8 are not supported with EDA. Transmission on 7 or 8 timeslots would not allow any concurrent USF monitoring in a single radio block period. In other words, the USF monitoring and transmission within the TDMA timeframe would collide.

According to one embodiment, higher uplink configurations, such as when u>=5, are supported for mobile stations signaling alternative EFTA multislot classes by applying parameters currently indicated by multislot class 45 when allocating a multislot configuration with the number of uplink timeslots higher than the signaled multislot class but still less than 6 (inclusive).

When the number of uplink timeslots assigned to the mobile station is greater than 6 and alternative EFTA multislot class 29 is indicated, the following solutions enable these configurations. First, the shifted USF and the timing advance offset (to) is not applied, in which case restrictions in monitoring the USF on certain timeslots may apply. Second, shifted USF is applied for the first uplink timeslot of the assigned configuration and is indicated on the downlink timeslot corresponding (same timeslot number) to the second uplink timeslot of the configuration, and the timing advance offset (to) is not applied. Third, shifted USF is applied for the first uplink timeslot of the assigned configuration and is indicated on the downlink timeslot corresponding (same timeslot number) to the second uplink timeslot of the configuration, and the timing advance offset (to) is applied. Fourth, all uplink timeslot assigned to the mobile station are exclusively allocated to the mobile station. In other words, the mobile station does not need to read the uplink state flags (USFs). Alternatively, when a mobile station indicates a high multislot class with an uplink capability of Tx(Sig)<5 or Tx (Sig)<6, i.e. a high multislot class not supporting shifted USF or timing advance offset (to), the mobile station may additionally indicate the support of high multislot classes 34, 39, 44 or 45 (e.g. as alternative EFTA multislot classes) (thus indicating support of, and allowing the network and the mobile station to take advantage of shifted USF and timing advance offset (to) mechanisms) for supporting an increased uplink capability.

The EFTA mechanism allows the prioritization of the uplink transmission over the downlink reception, and also supports higher receive and transmit capabilities by a mobile station indicating an alternative EFTA multislot class. EFTA operation is currently enabled by means of the assignment of an uplink TBF.

Current 3GPP specifications do not permit the network to assign downlink-only resources based on parameters derived from the alternative EFTA multislot class. Further, it is not clear whether an EFTA, uplink-only assignment could be made and based on which of the signaled or alternative multislot classes.

For example, from Table 2 above, the support and the operation of downlink-only configurations ("Downlink, any mode" rows) of more than 6 timeslots is not currently specified for an EFTA capable mobile station. However, it could be beneficial to allow the use of such multislot configurations as the mobile station indicating an alternative EFTA multislot class with such a capability would support it whether or not EFTA is used. Also, if it can be observed that the support and the operation of uplink-only configurations of more than 6 timeslots is not currently specified for an EFTA capable mobile station ("Uplink, Ext. Dynamic rows" of Table 2), the support of uplink-only configurations of 4 or 5 uplink timeslots is specified for an EFTA capable mobile station provided that EFTA is used for this assignment. However, it is not clear whether such multislot configurations could be assigned regardless of the Tx capability and of the support of shifted USF mechanism for the signaled multislot class, even if the alternative EFTA multislot class supports this Tx value. For example, it is not clear whether a multislot configuration of u=5 uplink timeslots could be assigned to and operated by a mobile station indicating a signaled multislot class supporting Tx=4 or less uplink timeslots, and therefore not supporting the shifted USF mechanism, even though the mobile station indicates an alternative EFTA multislot class supporting e.g. Tx=6 uplink timeslots. This is corroborating the previous assessment regarding full duplex (uplink+downlink) multislot configuration that using alternative EFTA multislot classes for indicating the support a higher number of uplink timeslots may not be advantageous as currently specified, and that the operation of certain resulting multislot configurations may not be supported by existing 3GPP specifications.

Thus, for downlink-only configurations, current standards may be amended to allow the maximum number of downlink timeslots that can be assigned to a mobile station having indicated an alternative EFTA multislot class to be the Rx of the alternative EFTA multislot class, regardless of the Rx of the signaled multislot class.

For extended uplink-only configurations, the support of uplink-only configurations based on alternative EFTA multislot classes may be removed regardless of whether EFTA is used. Alternatively, the use of shifted USF would be removed for EFTA configurations with u=5 when enabled by an alternative EFTA class (i.e. not supported by the signaled multislot class), noting that 1) alternative EFTA multislot classes capable of supporting a multislot configuration with u=5 is necessarily supporting a minimum value of Tx=6 (there is no half duplex class supporting Tx=5), for which the use of both Shifted USF and timing advance offset is required and 2) support of non-EFTA configurations with u=5 with multislot class 45 (Tx=6) does not require shifted USF.

It is noted that EFTA assumes the support of FTA. However, FTA and EFTA capabilities may be independently set by the mobile station which leads to the issue as to whether a network may use EFTA with a mobile station not supporting FTA. In order to resolve this issue, a mobile station indicating support of EFTA shall also indicate the support of FTA; alternatively, a network receiving from a mobile station an indication that the mobile station supports EFTA may use EFTA and shall assume that the mobile station also supports FTA; or, alternatively, a network receiving from a mobile station an indication that the mobile station supports EFTA and does not support FTA shall treat the mobile station as not supporting EFTA and not use EFTA with the mobile station.

It is also noted that FTA is not specified for being used in the DA medium access mode while EFTA support is indicated as supported for DA in the 3GPP standards. This leads to the ambiguity that the network may apply EFTA in configurations using DA. In order to resolve this ambiguity, the indication of EFTA support in DA medium access mode could be removed so that neither FTA nor EFTA would be supported in DA. Alternatively, the indication of FTA support could be extended to DA medium access mode so that both FTA and EFTA would be supported in DA.

Although 3GPP TS 45.002 Annex B.5 indicates that mobile stations with (DTM) EGPRS multislot classes 30-45 can support EFTA, this is overly restrictive. Thus, Annex B.5 may be modified to include mobile stations with GPRS multislot classes 30-45 as all the benefits of EFTA also applies to GPRS mobile stations.

There appears to be inconsistencies in the selective applicability of multislot capability parameters for EFTA as currently specified in 3GPP TS 45.002 Annex B.5 for certain combinations, inconsistencies that may result e.g. in the misinterpretation of the affected multislot capability parameters, in the unpredictable behavior of the network or of the mobile station as regards multislot configurations assignment and usage for EFTA, or in other restrictions of use related to EFTA, as demonstrated by the following examples.

It is noted that the following examples do not apply for a mobile station supporting increase of uplink capabilities. For the purposes of this document, a mobile station may be considered to be operating in one of either two modes. Mode 1 is defined as when the mobile station receives and transmits within a given TDMA frame or a given radio block period. Mode 2 is defined as when the mobile station has no block to transmit and only receives within a given TDMA frame or a given radio block period (i.e., operates in half-duplex mode). In this context, 'receives' includes receiving downlink transmissions for the purposes of determining subsequent allocations (e.g. by means of the USF mechanism), and 'transmits' includes transmitting data or control messages either in response to a allocation or a poll request.

Example 1

Figures 4A, 4B, 4C:
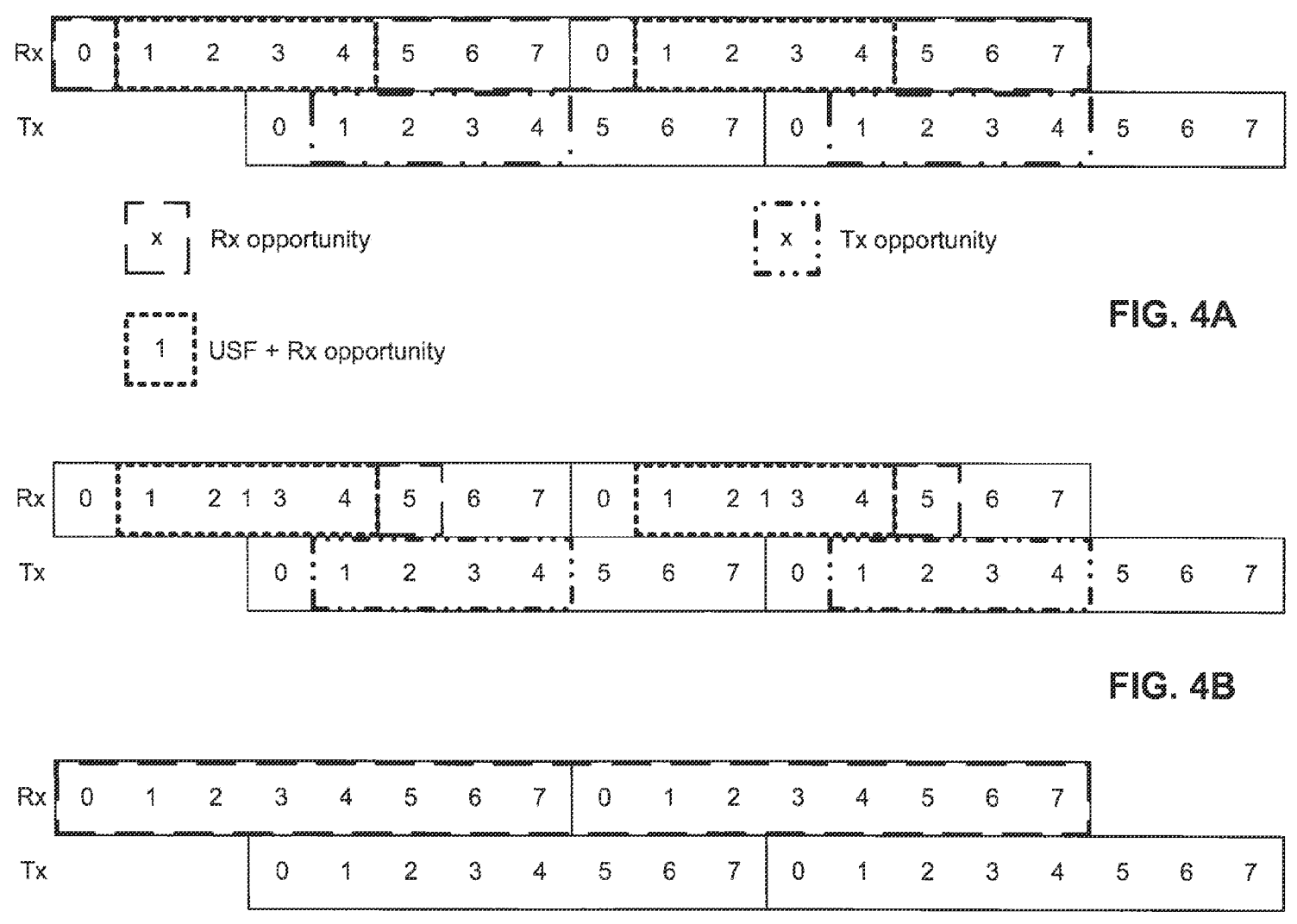

Example 1 is of a mobile station with a signaled multislot class 33 and indicating alternative EFTA multislot class 27. In FIG. 4A, a multislot configuration of Rx=8, Tx=4 EFTA (EDA) is considered. Downlink timeslots of 0-7 are repeated (only two TDMA frames are shown) as are the uplink timeslots immediate below the downlink timeslots. As described earlier, the downlink and uplink timeslots are offset relative to each other by 3 timeslots. Since Rx=8, all of the downlink timeslots 0-7 are assigned to the mobile station for possible downlink transmissions. This is indicated by the "Rx opportunity" pattern. In addition, since Tx=4, uplink timeslots 1-4 (inclusive) may be used for uplink transmission. This is indicated by the "Tx opportunity" pattern. Corresponding to the uplink timeslots 1-4, downlink timeslots 1-4 may be used to indicate future uplink allocations by means of the USF flags transmitted thereon; hence, downlink timeslots 1-4 are indicated by the "USF+Rx opportunity" pattern.

FIG. 11 shows a table 1100 illustrating selective applicability of multislot capability for signaled class 33 and alternative class 27 as currently specified in 3GPP TS 45.002 Annex B.5. The shaded cells indicate the questionability of the parameters according to Annex B.5 and will be analyzed below.

FIG. 4B illustrates mode 1, in which the mobile station receives and transmits. According to the setting of a USF field transmitted to the mobile station by the network in timeslot 1 of an earlier radio block (which in this example corresponded to the value of the USF field applicable to that timeslot as signaled in the assignment message assigning the uplink TBF), the mobile station may transmit radio blocks in uplink timeslots 1 to 4 (the timeslots to use are selected according to rules specified in TS 44.060 Annex N). Depending on the number of uplink timeslots actually used by the mobile station, the mobile station may monitor a variable number of downlink timeslots within timeslots 1 to 5.

Assuming the mobile station has at least one block to transmit, the mobile station is operating in a full duplex mode, and as such the number of timeslots that can be used by the mobile station in a full duplex timeslot configuration is maximized in applying the multislot capability of the signaled multislot class (33) of the mobile station (Rx=5, Tx=4, SUM=6), and the corresponding switching parameters (Tra=1 and Ttb=1) are applicable according to 9th row of part Down+up, Ext. Dynamic in 3GPP TS 45.002 v.9.5.0 Table 6.4.2.2.1. Accordingly, the assigned downlink timeslots 0, 6 and 7 cannot be monitored.

The application of the alternative EFTA multislot class parameter value for Ttb, as illustrated in FIG. 11 and specified in 3GPP TS 45.002 Annex B.5 has little relevance, as a reduced value of Ttb=0, defined for half duplex operation of a mobile station only transmitting in the considered radio block period is not relevant in this mode (the mobile station is in a full duplex mode) and Ttb=1 of the signaled class is the lowest possible value.

FIG. 4C illustrates Mode 2, in which the mobile station has no block to transmit and operates in a receive only mode on up to 8 Rx timeslots. In this operating mode, Tta/Ttb parameters, relevant to a mode of operation with uplink transmission—see 3GPP TS 45.002 Annex B.1, are not meaningful as the mobile station operates in a half duplex mode and does not transmit, except in case of polling by the network.

A similar configuration is described in the 2nd row of part Downlink, any mode in 3GPP TS 45.002 v. v.9.5.0 where Table 6.4.2.2.1 indicates that Tra parameter is not applicable (no timeslot left for measurements or BSIC decoding): Trb=0 (or 1) applies instead, which should be the case for such a configuration used with EFTA operation.

In case where only 7 downlink timeslots were allocated by the network, the applicability of Tra=1 of the signaled multislot class (supported by mobile station of high multislot classes 30-34) would allow measurements within the remaining timeslot, which would not be possible if Tra=2 of the alternative EFTA multislot class was used. The applicability of the signaled multislot class Tra parameter value is then beneficial for such a case (multislot classes 30-34 and 40-45).

Tra/Ttb of the signaled multislot class should also be applicable instead of the parameter values of the alternative EFTA multislot class in case the mobile station is polled by the network (Tra provides a lower value than the alternative EFTA multislot class parameter; as mentioned for the receive+transmit mode, the application of the alternative EFTA multislot class parameter value for Ttb has no obvious benefit).

During inter-mode transitions, the switching between Mode 1 and Mode 2 is governed by the Tra parameter. When switching from Mode 1 (receive+transmit) to Mode 2 (receive only), Tra=1 must be respected (transmit to receive transition). When switching from Mode 2 to Mode 1, Tra=0 or 1 must be respected (receive to receive transition).

Table 5 illustrates the relevant multislot capabilities for each operated mode in Example 1.

TABLE 5

Relevant multislot capabilities: signaled class 33/alternative class 27

| Parameter | Rx + Tx mode | Rx-only mode | Comments |
|---|---|---|---|
| Rx | Rx(sig) = 5 | Rx(alt) = 8 | |
| Tx | Tx(sig) = 4 | NA | Tx-only mode is not considered. |
| Sum | Sum(sig) = 6 | NA | Sum is applicable in Rx + Tx mode. |
| Tta | NA | NA | Tta is never applicable. |
| Trb | NA | Trb(alt) = 0-1 | Trb(alt) is generally applicable in Rx-only mode except in case of polling. |
| Tra | Tra(sig) = 1 | Tra(sig) = 1 | Tra(sig) is applicable in Rx + Tx mode and may be applicable in Rx-only mode (polling or configurations with d = 7). |
| Ttb | Ttb(sig) = 1 | Ttb(sig) = 1 | Ttb(sig) is applicable in Rx + Tx mode and may be applicable in Rx-only mode (polling). | sig = signaled multislot class
alt = alternative EFTA multislot class

Example 2

Figures 5A, 5B, 5C:
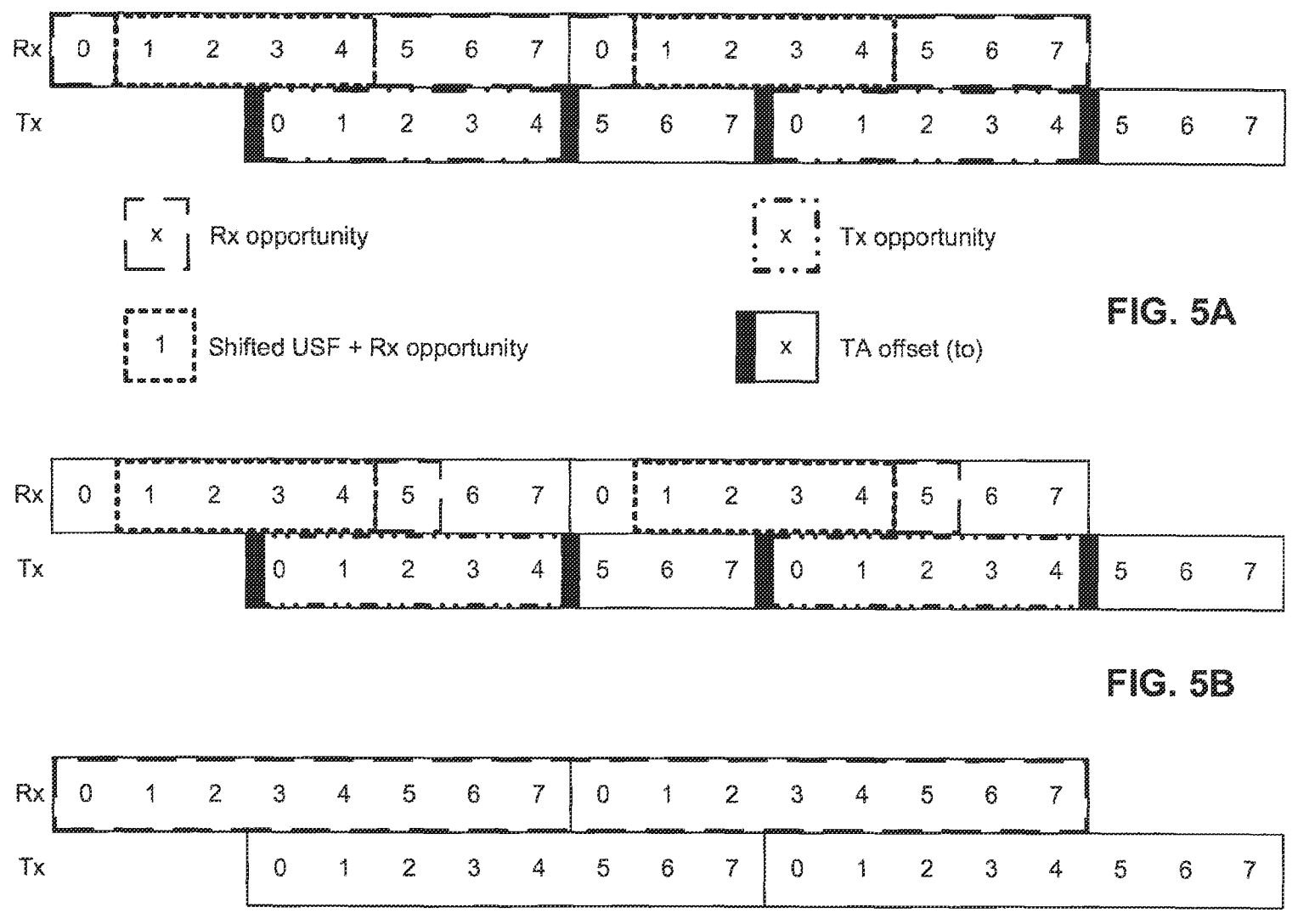

Example 2 is of a mobile station with a signaled multislot class 39 and indicating alternative EFTA multislot class 27. In FIG. 5A, a multislot configuration of Rx=8, Tx=5 EFTA (EDA) is considered. Downlink timeslots of 0-7 are repeated (only two TDMA frames are shown) as are the uplink timeslots immediate below the downlink timeslots. Similar to Example 1, since Rx=8, all of the downlink timeslots 0-7 are assigned to the mobile station for possible downlink transmissions. This is indicated by the "Rx opportunity" pattern. In addition, since Tx=5, uplink timeslots 0-4 (inclusive) may be used for uplink transmission ("Tx opportunity pattern"). Corresponding to the uplink timeslots 0-4, downlink timeslots 1-4 may be used to indicate future uplink allocations by means of the USF flags—including shifted USF flag in downlink timeslot 1—transmitted thereon ("Shifted USF+Rx opportunity" pattern), Further, as class 39 requires a timing advance offset (to) due to the improvements made to switch and measurement times, the transmission (uplink) timebase/multiframe is shifted with respect to the reception (downlink) timebase. This is indicated by the "TA offset (to)" pattern.

It is noted that the definition of switching times for high multislot classes involving a Timing Advance offset (to) in 3GPP TS 45.002 Annex B.1 is not consistent in that the "to" value must be deducted from the value currently specified for Ttb (i.e. Ttb should equal 1–to) so that SUM+Tra+Ttb does not exceed 8 timeslots per TDMA where the combination Tra/Ttb is used (Tra=1+to). Further, it should be observed that the uplink capability of multislot classes 34, 39 or 44 (i.e. Tx=5) does not exist with any of classes 19-29, which is a restriction with the specified applicability of this parameter from the alternative EFTA multislot class as the value should then be reduced to 4 (the support of 6 or more uplink timeslots would only be possible with fixed allocation in half-duplex uplink mode or possibly exclusive allocation). In the present example, it is however assumed that a configuration with Tx=5 is possible.

FIG. 12 shows a table 1200 illustrating selective applicability of multislot capability for signaled class 39 and alternative class 27 as currently specified in 3GPP TS 45.002 Annex B.5.

FIG. 5B illustrates Mode 1, in which the mobile station receives and transmits. According to the setting of a USF field transmitted to the mobile station by the network in timeslot 1 (shifted USF) of an earlier radio block, the mobile station may transmit radio blocks in uplink timeslots 0 to 4. Depending on the number of uplink timeslots actually used by the mobile station, the mobile station may monitor a variable number of downlink timeslots within timeslots 1 to 5.

Assuming the mobile station has at least one block to transmit, the mobile station is operating in a full duplex mode, and as such the number of timeslots that can be used by the mobile station in a full duplex timeslot configuration is maximized in applying the multislot capability of the signaled multislot class (39) of the mobile station (Rx=5, Tx=5, SUM=6), and the corresponding switching parameters (Tra=1+to, Ttb=1−to) are applicable (10th row of part Down+up, Ext. Dynamic in 3GPP TS 45.002 v.9.5.0 Table 6.4.2.2.1).

As mentioned for Example 1, a reduced value of Ttb=0 of the alternative EFTA multislot class cannot apply as the mobile station is in a full duplex mode. Further, the value Ttb=1 of the alternative EFTA multislot class is not consistent with Tra=1+to of the signaled class (the Timing Advance offset applies on both receive to transmit and transmit to receive transitions). Hence, Ttb=1−to of the signaled multislot class should apply instead and use the parameter value of the alternative EFTA multislot class, as illustrated in FIG. 12 and specified in 3GPP TS 45.002 Annex B.5 is inconsistent.

FIG. 5C illustrates Mode 2, in which the mobile station has no block to transmit and operates in a receive only mode on up to 8 Rx timeslots as per the alternative EFTA multislot class 27 capability. The use of this allocation is similar as for Example 1 (Trb=0 or 1), with the particularity that, in the specific case of a polling of the network occurs, both Tra and Ttb of the signaled multislot class, depending on the offset "to," should be applied (the offset "to" being relevant and applicable as soon as the mobile station has to switch between reception and transmission).

In Mode 2 however, the applicability of Tra=1+to from the signaled multislot class would not permit a configuration with 7 downlink timeslots together with performing measurements as suggested in Example 1. A value of Tra=1 would be needed (as with multislot class 34), and only Trb is applicable (no measurement possible) in case the network assigns a downlink multislot configuration of 7 timeslots.

During inter-mode transitions, the switching between the Mode 1 and Mode 2 is governed by the Tra parameter. When switching from Mode 1 to Mode 2, Tra=1+to must be respected. When switching from Mode 2 to Mode 1, Tra=0/1 must be respected.

Table 7 illustrates the relevant multislot capabilities for each operated mode.

TABLE 7

Relevant multislot capabilities: signaled class 39/alternative class 27

| Parameter | Rx + Tx mode | Rx-only mode | Comments |
| --- | --- | --- | --- |
| Rx | Rx(sig) = 5 | Rx(alt) = 8 | |
| Tx | Tx(sig) = 5 | NA | Tx-only mode is not considered. |
| Sum | Sum(sig) = 6 | NA | Sum is applicable in Rx + Tx mode. |
| Tta | NA | NA | Tta is never applicable. |
| Trb | NA | Trb(alt) = 0-1 | Trb(alt) is generally applicable in Rx-only mode except in case of polling. |

TABLE 7-continued

Relevant multislot capabilities: signaled class 39/alternative class 27

| Parameter | Rx + Tx mode | Rx-only mode | Comments |
| --- | --- | --- | --- |
| Tra | Tra(sig) = 1 + to | Tra(sig) = 1+ to | Tra(sig) is applicable in Rx + Tx mode and may be applicable in Rx-only mode (polling). |
| Ttb | Ttb(sig) = 1 − to | Ttb(sig) = 1− to | Ttb(sig) is applicable in Rx + Tx mode and may be applicable in Rx-only mode (polling). | sig = signaled multislot class
alt = alternative EFTA multislot class

Example 3

Figures 6A, 6B, 6C:
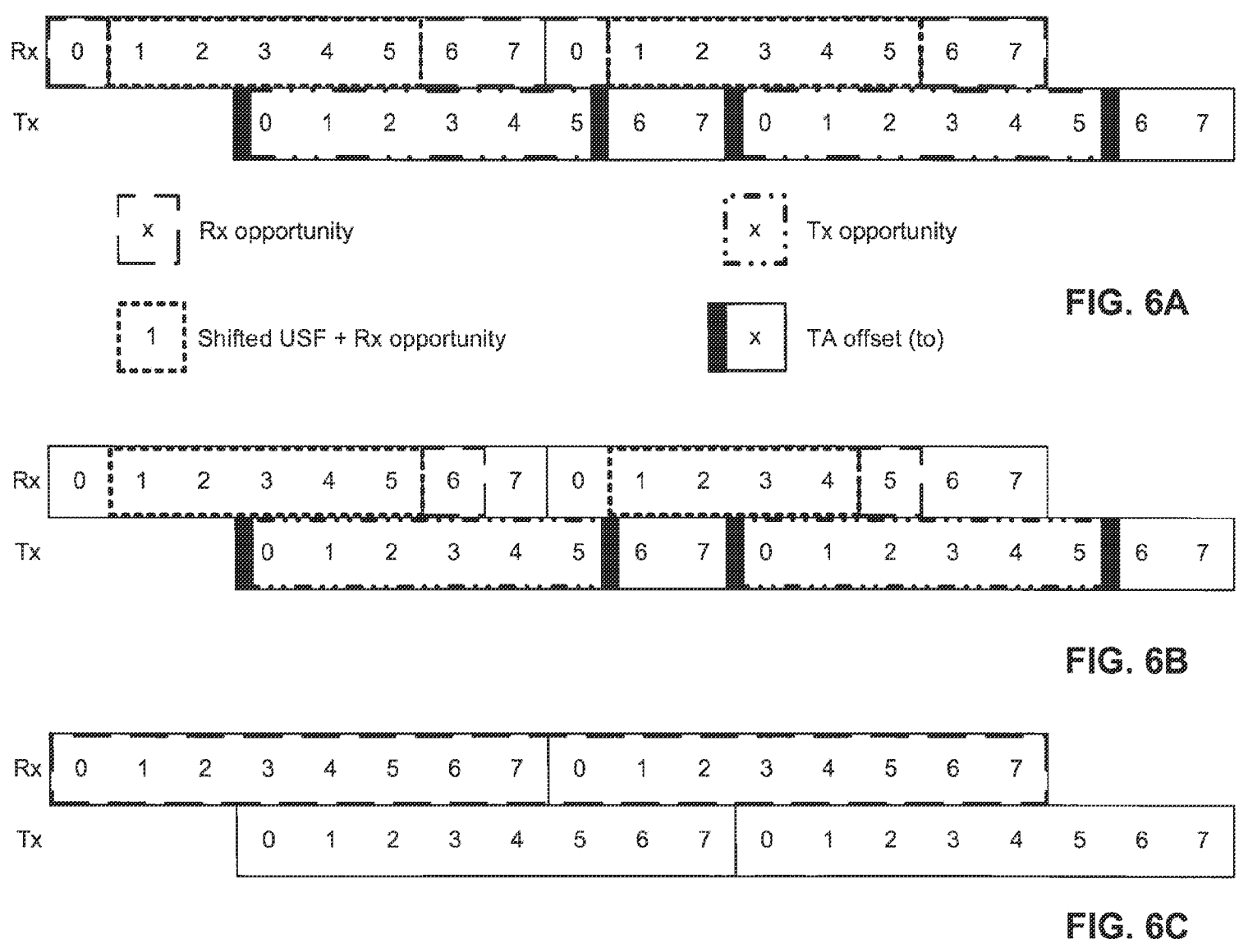

Example 3 is of a mobile station with a signaled multislot class 45 and indicating alternative EFTA multislot class 28. In FIG. 6A, a multislot configuration of Rx=8, Tx=6 EFTA (EDA) is considered. Downlink timeslots of 0-7 are repeated (only two TDMA frames are shown) as are the uplink timeslots immediate below the downlink timeslots. Similar to Examples 1 and 2, since Rx=8, all of the downlink timeslots 0-7 are assigned to the mobile station for possible downlink transmissions. This is indicated by the "Rx opportunity" pattern. In addition, since Tx=6, uplink timeslots 0-5 (inclusive) may be used for uplink transmission ("Tx opportunity" pattern). Corresponding to the uplink timeslots 0-5, downlink timeslots 1-5 may be used to indicate future uplink allocations by means of the USF flags—including shifted USF flag in downlink timeslot 1—transmitted thereon ("Shifted USF+Rx opportunity" pattern), Further, as class 45 requires a timing advance offset (to) due to the improvements made to switch and measurement times, the transmission (uplink) timebase is shifted with respect to the reception (downlink) timebase. This is indicated by the "TA offset (to)" pattern.

It is noted that the definition of switching times for high multislot classes involving a Timing Advance offset (to) in 3GPP TS 45.002 Annex B.1 is not consistent in that the "to" value must be deducted from the value currently specified for Tta (i.e. Tta should equal 1−to) so that SUM+Tta+Trb does not exceed 8 timeslots per TDMA where the combination Tta/Trb is used (Trb=to).

FIG. 13 shows a table 1300 illustrating selective applicability of multislot capability for signaled class 45 and alternative class 28 as currently specified in 3GPP TS 45.002 Annex B.5.

FIG. 6B illustrates Mode 1, in which the mobile station receives and transmits within a given TDMA frame or a given radio block period. According to the setting of a USF field transmitted to the mobile station by the network in timeslot 1 (shifted USF) of an earlier radio block, the mobile station may transmit radio blocks in uplink timeslots 0 to 5. Depending on the number of uplink timeslots actually used by the mobile station, the mobile station may monitor downlink a variable number of timeslots within timeslots 1 to 6.

Assuming the mobile station has at least one block to transmit, the mobile station is operating in a full duplex mode, and as such the number of timeslots that can be used by the mobile station in a full duplex timeslot configuration is maximized in applying the multislot capability of by the signaled multislot class (45) of the mobile station (Rx=6, Tx=6, SUM=7), and the corresponding switching parameters (Tta=1−to, Trb=to) are applicable (15th row of part Down+up, Ext. Dynamic in 3GPP TS 45.002 v.9.5.0 Table 6.4.2.2.1). This is consistently reflected in 3GPP TS 45.002 Annex B.5.

In this mode, a reduced value of Ttb=0 of the alternative EFTA multislot class cannot apply as the mobile station alternates between reception and transmission. It is noted that for multislot configurations where Tra/Ttb apply instead of Tta/Trb (e.g. for configurations with a lower number of uplink timeslots), the corresponding attributes of the signaled multislot class should apply either, and using Ttb=0-1 of the alternative EFTA multislot class, as illustrated in FIG. 13 and specified in 3GPP TS 45.002 Annex B.5, has little relevance (see Example 1).

FIG. 6C illustrates Mode 2, in which the mobile station has no block to transmit and operates in a receive only mode on up to 8 Rx timeslots as per the alternative EFTA multislot class 28 capability. The usage of this allocation is similar as in Examples 1 and 2 (Trb=0 or 1), with the difference that, in case of polling, Tta and Trb of the signaled multislot class should be applicable (instead of Tra and Ttb).

As for Example 1, the applicability of Tra=1 from the signaled multislot class would be beneficial for allowing a configuration with 7 downlink timeslots together with performing measurements.

During inter-mode transitions, the switching between the Mode 1 and Mode 2 is governed by the Tra and Trb parameters. When switching from Mode 1 to Mode 2, Trb=to must be respected. When switching from Mode 2 to Mode 1, Tra=0/1 must be respected.

The following table illustrates the relevant multislot capabilities for each operated mode.

TABLE 9

Relevant multislot capabilities: signaled class 45/alternative class 28

| Parameter | Rx + Tx mode | Rx-only mode | Comments |
|---|---|---|---|
| Rx | Rx(sig) = 6 | Rx(alt) = 8 | |
| Tx | Tx(sig) = 6 | NA | Tx-only mode is not considered. |
| Sum | Sum(sig) = 7 | NA | Sum is applicable in Rx + Tx mode |
| Tta | Tta(sig) = 1 – to | Tta(sig) = 1 – to | Tta(sig) is applicable in Rx + Tx mode and may be applicable in Rx-only mode (polling). |
| Trb | Trb(sig) = to | Trb(alt) = 0-1/ Trb(sig) = to | Trb(sig) is applicable in Rx + Tx mode. Trb(alt) = 0-1 is generally applicable in Rx-only mode, unless in case of polling where Trb(sig) = to is applicable. |
| Tra | NA | Tra(sig) = 1 | Tra(sig) may be applicable in Rx-only mode for configurations with d = 7. |
| Ttb | NA | NA | Ttb is never applicable. | sig = signaled multislot class
alt = alternative EFTA multislot class

Example 4

Figure 7:
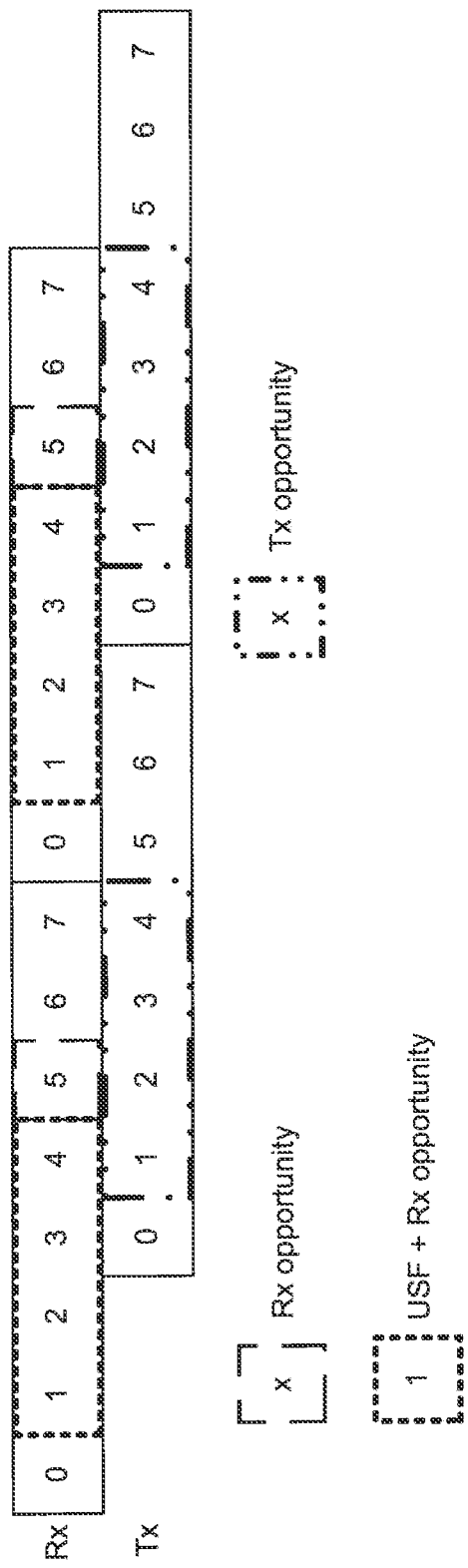
FIG. 7 is a timing diagram of uplink and downlink timeslots with signaled multislot class 33 and no alternative EFTA multislot class.

Example 4 is of a mobile station with a signaled multislot class 33 and not indicating an alternative EFTA multislot class. In FIG. 7, a multislot configuration of Rx=5, Tx=4 EFTA (EDA) is considered. Downlink timeslots of 0-7 are repeated (only two TDMA frames are shown) as are the uplink timeslots immediate below the downlink timeslots. Unlike the examples above, since Rx=5, only downlink timeslots 1-5 (inclusive) are assigned to the mobile station for possible downlink transmissions. This is indicated by the "Rx opportunity" pattern. In addition, since Tx=4, uplink timeslots 1-4 (inclusive) may be used for uplink transmission. Corresponding to the uplink timeslots 1-4, downlink timeslots 1-4 may be used to indicate future uplink allocations by means of the USF flags transmitted thereon ("USF+ Rx opportunity" pattern), FIG. 14 shows a table 1400 illustrating selective applicability of multi slot capability for signaled class 33 and no alternative class as currently specified in 3GPP TS 45.002 Annex B.5.

Mode 1 is defined as the operating mode in which the mobile station receives and transmits within a given TDMA frame or a given radio block period. According to the setting of a USF field transmitted to the mobile station by the network in timeslot 1 of an earlier radio block, the mobile station may transmit radio blocks in uplink timeslots 1 to 4. Depending on the number of uplink timeslots actually used by the mobile station, the mobile station may monitor a variable number of downlink timeslots within timeslots 1 to 5.

Assuming the mobile station has at least one block to transmit, the mobile station is operating in a full duplex mode, and as such the number of timeslots that can be used by the mobile station is in a full duplex timeslot configuration is maximized in applying the multislot capability of by the signaled multislot class (33) of the mobile station (Rx=5, Tx=4, SUM=6), and the corresponding switching parameters (Tra=1, Ttb=1) are applicable (9th row of part Down+up, Ext. Dynamic in 3GPP TS 45.002 v.9.5.0 Table 6.4.2.2.1).

The application of multi slot class 19-29 parameter value for Ttb, as illustrated in FIG. 14 and specified in 3GPP TS 45.002 Annex B.5, has little relevance for this mode, as a reduced value of Ttb=0 defined for half duplex operation of a mobile station only transmitting in the considered radio block period is not relevant in this mode (the mobile station is in a full duplex mode), and Ttb=1 of the signaled multislot class is the lowest possible value. Additionally, the applicable switching times for multislot class 33 (Tra=1, Ttb=1) specified for the case where EFTA is not used, allow the use of the maximum timeslots capability of the mobile station (SUM=6) when the mobile station has to receive and transmit in a given radio block period.

Mode 2 is defined as the operating mode in which the mobile station only receives within a given TDMA frame or a given radio block period. In this mode, all the assigned downlink timeslots (up to 5) may be monitored. Nothing would prevent the mobile station to transmit in uplink if need be as this would not affect the switching parameters Tra=1 and Ttb=1 of multislot class 33 while monitoring up to 5 downlink timeslots, which is the maximum downlink timeslots capability (Rx) of the corresponding multislot class.

The application of a reduced value (Trb=0 instead of Tra), as illustrated in Table 10 and specified in 3GPP TS 45.002 Annex B.5, has no meaning for this mode, as this would not allow to increase the downlink timeslots capability of the considered multislot class (Rx=5).

During inter-mode transitions, the normal operation for class 33 applies. [079+] The following table illustrates the relevant multislot capabilities for each operated mode.

TABLE 11

Relevant multislot capabilities: signaled class 33/No alternative class

| Parameter | Rx + Tx mode | Rx-only mode | Comments |
|---|---|---|---|
| Rx | Rx(sig) = 5 | Rx(sig) = 8 | |
| Tx | Tx(sig) = 4 | NA | Tx-only mode is not considered. |
| Sum | Sum(sig) = 6 | Sum(sig) = 6 | |
| Tta | NA | NA | Tta is never applicable. |
| Trb | NA | NA | Trb is never applicable. |
| Tra | Tra(sig) = 1 | Tra(sig) = 1 | Tra(sig) is applicable in both Rx + Tx mode and in Rx-only mode. |
| Ttb | Ttb(sig) = 1 | Ttb(sig) = 1 | Ttb(sig) is applicable in Rx + Tx mode and in Rx-only mode. | sig = signaled multislot class

Example 5

Figure 8:
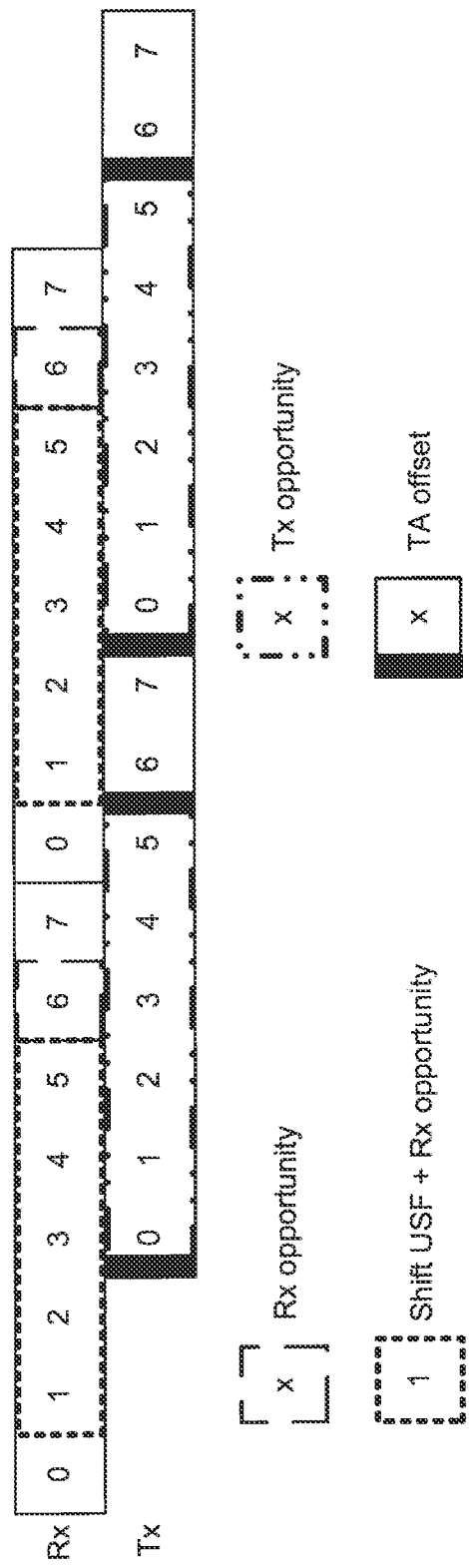
FIG. 8 is a timing diagram of uplink and downlink timeslots with signaled multislot class 45 and no alternative EFTA multislot class.

Example 5 is of a mobile station with a signaled multislot class 45 and not indicating an alternative EFTA multislot class. In FIG. 8, a multislot configuration of Rx=6, Tx=6 EFTA (EDA) is considered. Downlink timeslots of 0-7 are repeated (only two TDMA frames are shown) as are the uplink timeslots immediate below the downlink timeslots. Unlike the examples above, since Rx=6, downlink timeslots 1-6 (inclusive) are assigned to the mobile station for possible downlink transmissions. This is indicated by the Rx opportunity pattern. In addition, since Tx=6, uplink timeslots 0-5 (inclusive) may be used for uplink transmission (Tx opportunity pattern). Corresponding to the uplink timeslots 0-5, downlink timeslots 1-5 may be used to indicate future uplink allocations by means of the USF flags—including shifted USF flag in downlink timeslot 1—transmitted thereon ("Shifted USF+Rx opportunity" pattern), Further, as class 45 requires a timing advance offset (to) due to the improvements made to switch and measurement times, the transmission (uplink) timebase is shifted with respect to the reception (downlink) timebase. This is indicated by the TA offset (to) pattern.

It is noted that the definition of switching times for high multislot classes involving a Timing Advance offset (to) in 3GPP TS 45.002 Annex B.1 is not consistent in that the "to" value must be deducted from the value currently specified for Tta (i.e. Tta should equal 1−to) so that SUM+Tta+Trb does not exceed 8 timeslots per TDMA where the combination Tta/Trb is used (Trb=to).

Figure 15:
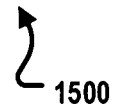
FIG. 15 shows a table illustrating selective applicability of multislot capability for signaled class 45 and no alternative class as currently specified in 3GPP TS 45.002 Annex B.5.

FIG. 15 shows a table 1500 illustrating selective applicability of multislot capability for signaled class 45 and no alternative class as currently specified in 3GPP TS 45.002 Annex B.5.

Mode 1 is defined as the operating mode in which the mobile station receives and transmits within a given TDMA frame or a given radio block period. According to the setting of a USF field transmitted to the mobile station by the network in timeslot 1 (shifted USF) of an earlier radio block, the mobile station may transmit radio blocks in uplink timeslots 0 to 5. Depending on the number of uplink timeslots actually used by the mobile station, the mobile station may monitor a variable number of downlink timeslots within timeslots 1 to 6.

Assuming the mobile station has at least one block to transmit, the mobile station is operating in a full duplex mode, and as such the number of timeslots that can be used by the mobile station in a full duplex timeslot configuration is maximized in applying the multislot capability of by the signaled multislot class (45) of the mobile station (Rx=6, Tx=6, SUM=7) and the corresponding switching parameters (Tta=1−to, Trb=to) are applicable (15th row of part Down+up, Ext. Dynamic in 3GPP TS 45.002 v. v.9.5.0 Table 6.4.2.2.1). This is consistently reflected in 3GPP TS 45.002 Annex B.5.

Mode 2 is defined as the operating mode in which the mobile station only receives within a given TDMA frame or a given radio block period. In this mode, all the assigned downlink timeslots (up to 6) may be monitored. Nothing would prevent the mobile station to transmit in uplink if need be as this would not affect the switching parameters Tta=1−to and Trb=to of multislot class 45 while monitoring up to 6 downlink timeslots, which is the maximum downlink timeslots capability (Rx) of the corresponding multislot class.

The application of a reduced switching time (Ttb=0 instead of Tta), as illustrated in FIG. 15 and specified in 3GPP TS 45.002 Annex B.5, has no meaning for this mode, as this would not allow to increase the downlink timeslots capability of the considered multislot class (Rx=6).

During inter-mode transitions, the normal operation for class 45 applies. [085+] The following table illustrates the relevant multislot capabilities for each operated mode.

TABLE 13

Relevant multislot capabilities: signaled class 45/No alternative class

| Parameter | Rx + Tx mode | Rx-only mode | Comments |
|---|---|---|---|
| Rx | Rx(sig) = 6 | Rx(sig) = 8 | |
| Tx | Tx(sig) = 6 | NA | Tx-only mode is not considered. |
| Sum | Sum(sig) = 7 | Sum(sig) = 7 | |
| Tta | Tta(sig) = 1 − to | Tta(sig) = 1 − to | Tta(sig) is applicable in both Rx + Tx mode and in Rx-only mode. |
| Trb | Trb(sig) = to | Trb(sig) = to | Trb(sig) is applicable in both Rx + Tx mode and in Rx-only mode. |
| Tra | NA | NA | Tra is never applicable. |
| Ttb | NA | NA | Ttb is never applicable. | sig = signaled multislot class

Since the use of alternative EFTA multislot classes for allowing a higher number of uplink timeslots may not be advantageous or supported, the use of alternative EFTA multislot classes could be restricted to the support of only additional downlink timeslots, and new rules are implemented for deriving the multislot capability parameters applicable to EFTA operation.

The use of multislot classes 19-29 as alternative EFTA multislot classes only allows the support of Rx=6 or Rx=8 receive timeslots (see Table 3). This is restrictive for a mobile station that would be able to support a configuration of up to Rx=7 receive timeslots, but not up to Rx=8 receive timeslots. As such, a mobile station would only be able to signal support of Rx=6 to the network.

Figure 9:
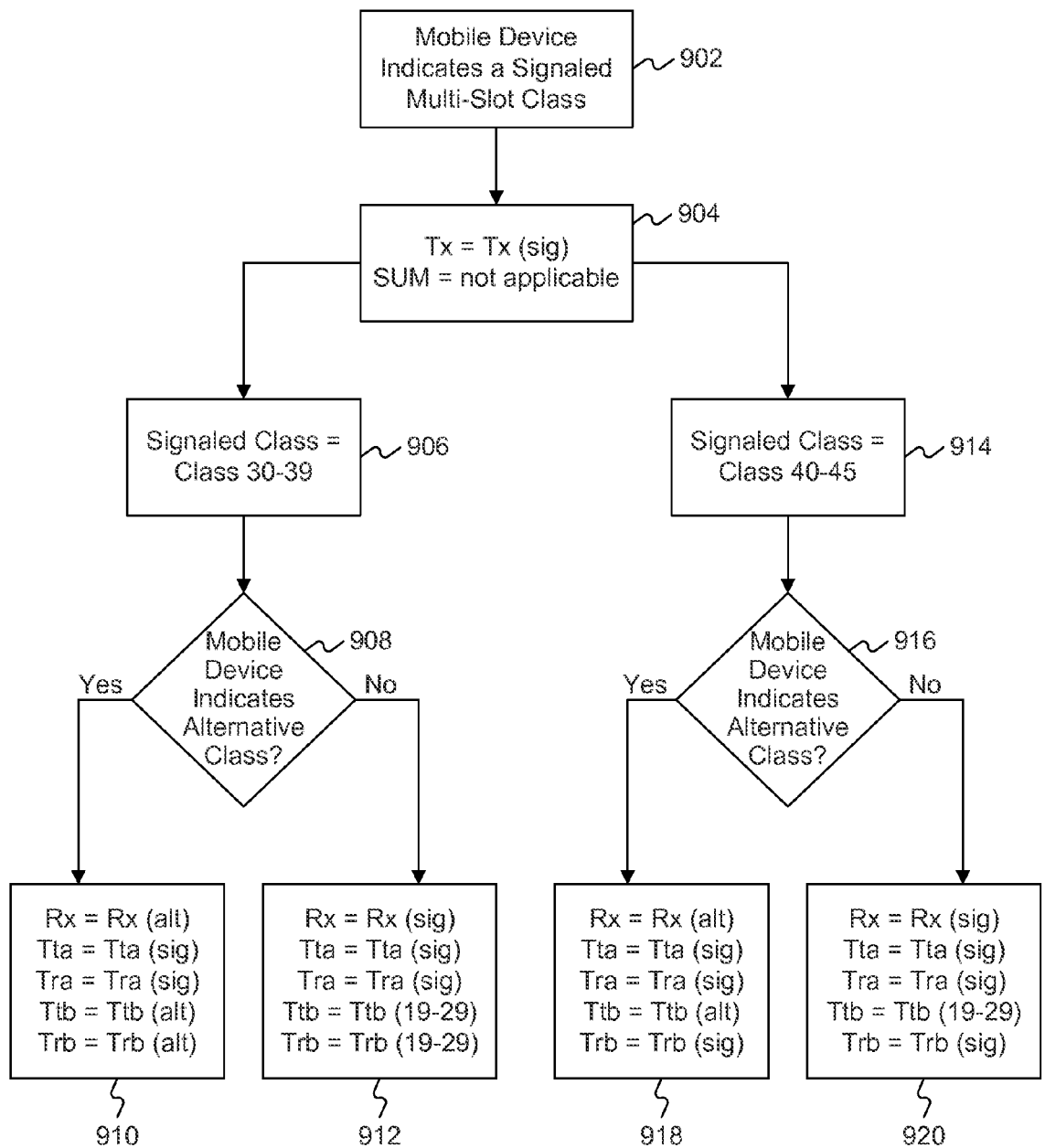
FIG. 9 is a block diagram illustrating a process of determining multislot capability parameters of a mobile station supporting EFTA.

FIG. 9 provides an exemplary embodiment of a method of determining the multislot capability parameters of a mobile station supporting EFTA. The method may be performed by base station 12 or other devices on the network 20 including the mobile station 10.

The process begins at block 902 with the mobile station signaling a multislot class belonging to one of classes 30-45. In this exemplary embodiment, the use of alternative EFTA multislot is restricted to the support of additional downlink timeslots (Rx parameters). As such, the Tx parameter value corresponding to the signaled multislot class always applies for EFTA and the SUM parameter value corresponding to the signaled multislot class is not applicable as indicated by block 904.

Next, block 906 indicates if the signaled multislot class belongs to one of multislot classes 30-39. If the mobile station does indicate an alternative EFTA multislot class at block 908, then the Rx, Ttb and Trb parameter values of the alternative EFTA multislot class, and Tta and Tra parameter values of the signaled multislot class apply as the multislot capability parameters (Block 910). If the mobile station does not indicate an alternative EFTA multislot class at block 908, then Rx, Tta, Tra parameter values of the signaled multislot class, and Ttb and Trb parameter values of multislot classes 19-29 apply as the multislot capability parameters (Block 912).

On the other hand, if the signaled multislot class belongs to one of multislot classes (Block 914), it is also determined if the mobile station also indicates an alternative EFTA multislot class (Block 916). If the mobile station does indicate an alternative EFTA multislot class, then the Rx and Ttb parameter values of the alternative EFTA multislot class, and Tta, Tra, and Trb parameter values of the signaled multislot class apply as the multislot capability parameters (Block 918). If the mobile station does not indicate an alternative EFTA multislot class, then Rx, Tta, Tra, and Trb parameter values of the signaled multislot class, and Ttb parameter values of multislot classes 19-29 apply as the multislot capability parameters (Block 920).

As indicated above, the existing rules for the selective applicability of the Ttb and Trb parameters is based on the signaled and alternative multislot classes capabilities (3GPP TS 45.002 Annex B.5) which may lead to inconsistent or inapplicable parameters values in certain timeslots configurations or in certain operations modes. This approach may be replaced by a new approach based on whether an alternative multislot class is indicated by the mobile station, on the assigned resources (i.e. the assigned timeslot configuration), and on the dynamic use of the allocated resources by the mobile station during a given radio block period.

Figure 10:
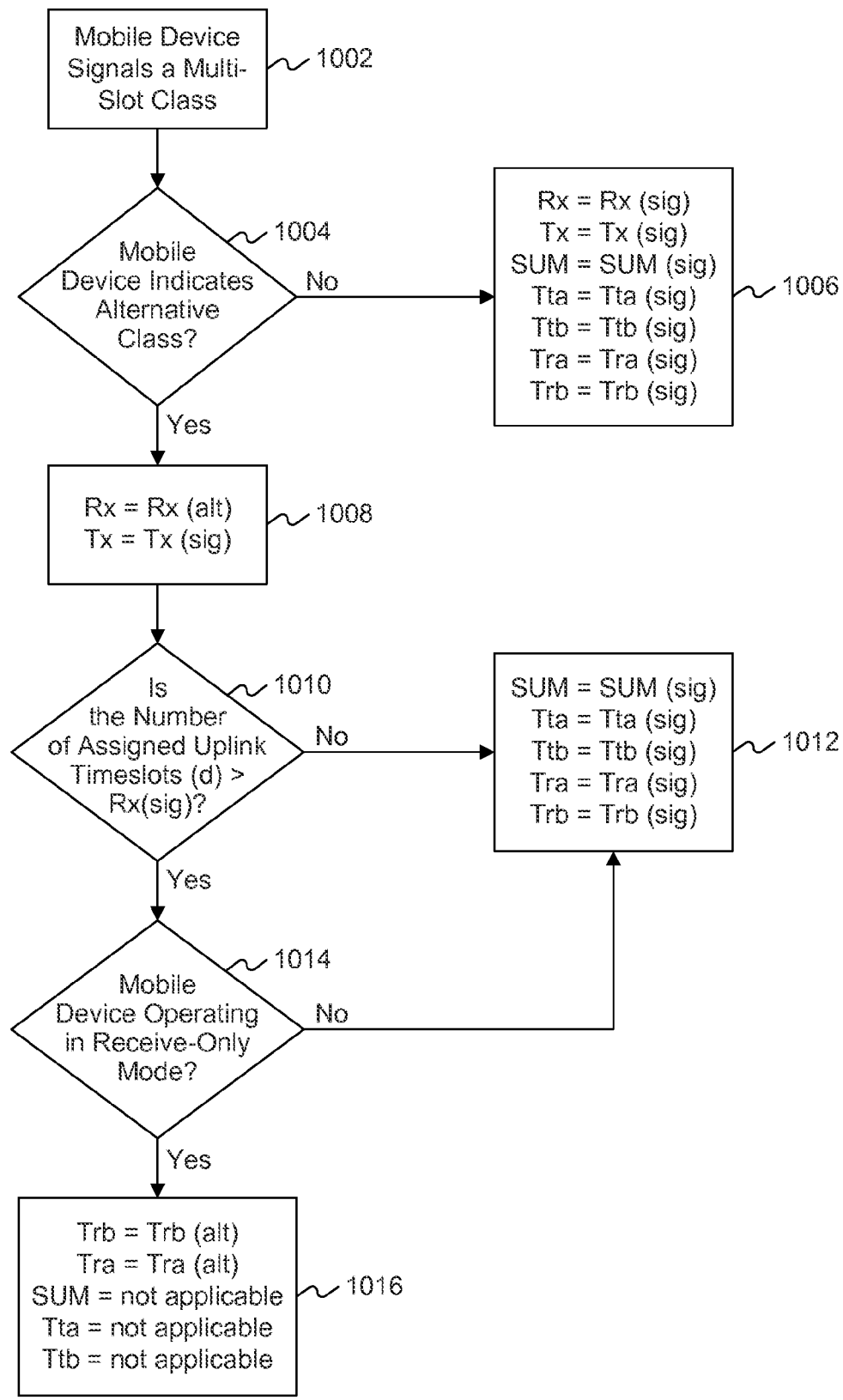
FIG. 10 is a block diagram illustrating another process of determining multislot capability parameters of a mobile station supporting EFTA.

FIG. 10 provides an embodiment of a method of determining the multislot capability parameters of a mobile station supporting EFTA. The method may be performed by base station 12 or other devices on the network 20 including the mobile station 10.

The process begins when the mobile station first indicates a signaled multislot class (Block 1002). Next, it is determined whether the mobile station indicates an alternative EFTA multislot class (Block 1004). If no alternative EFTA multislot class is indicated, the Rx, Tx, SUM, Tta, Ttb, Tra, and Trb parameter values of the signaled multislot class apply as the multislot capability parameters (Block 1006). If an alternative EFTA multislot class is indicated, the Rx parameter value of the alternative EFTA multislot class and the Tx parameter value of the signaled EFTA multislot class apply (Block 1008). Next, still for the case when an alternative EFTA multislot class is indicated, it is determined whether the mobile station is assigned a multislot configuration comprising a number of downlink timeslots higher than the Rx value corresponding to the signaled multislot class (Block 1010), and the mobile station is not transmitting in a given radio block period (Block 1014). If both of the two conditions are met, Trb and Tra parameter values of the alternative EFTA multislot class apply and the SUM, Tta and Ttb parameters are not applicable (Block 1016). In all other conditions, SUM, Tta, Ttb, Tra, and Trb parameter values of the signaled multislot class apply as the multislot capability parameters (Block 1012). The above rules of FIG. 10 for deriving the multislot capability parameters are illustrated in Table 14 below.

TABLE 14

Derived Multislot Capability Parameters

| MS in Transmit + Receive mode | | MS in Receive-only mode | |
|---|---|---|---|
| No alternative EFTA multislot class | With alternative EFTA multislot class | No alternative EFTA multislot class or d <= Rx(Sig) | With alternative EFTA multislot class and d > Rx(Sig) |
| Rx(Sig) | Rx(Alt) | Rx(Sig) | Rx(Alt) |
| Tx(Sig) | Tx(Sig) | Tx(Sig) | Tx(Sig) |
| Sum(Sig) | Sum(Sig) | Sum(Sig) | NA |
| Tta(Sig) | Tta(Sig) | Tta(Sig) | NA |
| Trb(Sig) | Trb(Sig) | Trb(Sig) | Trb(Alt) |
| Tra(Sig) | Tra(Sig) | Tra(Sig) | Tra(Alt) |
| Ttb(Sig) | Ttb(Sig) | Ttb(Sig) | NA |

Sig = parameter value derived from the signalled multislot class
Alt = parameter value derived from the alternative EFTA multislot class In this exemplary embodiment, the use of alternative EFTA multislot is restricted to the support of additional downlink timeslots (Rx parameters). As indicated previously, since the usage of multislot classes 19-29 as alternative EFTA multislot classes only allows for the support of Rx=6 or 8 receive timeslots, but not Rx=7 timeslots, alternative EFTA multislot classes are redefined to expand the downlink capabilities of the mobile station correspondingly. Table 15 indicates three new alternative EFTA multislot classes, and Table 16 illustrates modified Table 10.5.146/ 3GPP TS 24.008. It is noted that the method of FIG. 10 applies for these newly defined alternative EFTA multislot classes as well.

TABLE 15

Redefined Alternative EFTA Multislot Classes

| Alternative EFTA Multislot Class | Rx | Tra | Trb |
|---|---|---|---|
| Alternative EFTA Multislot Class 1 | 6 | 1 | = 1 with frequency hopping = 0 without frequency hopping |
| Alternative EFTA Multislot Class 2 | 7 | 1 | = 1 with frequency hopping = 0 without frequency hopping |
| Alternative EFTA Multislot Class 3 | 8 | 1 | = 1 with frequency hopping = 0 without frequency hopping |

TABLE 16

Example field to be included in Table 10.5.146/3GPP TS 24.008
Alternative EFTA multislot class (4 bit field)
The presence of the Alternative EFTA multislot class field indicates that the mobile station supports Enhanced Flexible Timeslot Assignment, EFTA, (see 3GPP TS 45.002 [32]). This field shall be ignored if the High Multislot Capability field is not present. The Alternative EFTA multislot class field is used together with the (DTM) EGPRS (high) multislot class to determine the mobile stations capabilities when using Enhanced Flexible Timeslot Assignment, EFTA, and is coded as follows:

| Bit | | | | |
|---|---|---|---|---|
| 4 | 3 | 2 | 1 | |
| 0 | 0 | 0 | 0 | No Alternative EFTA multislot class is indicated. Use (DTM) EGPRS (High) multislot class only. |
| 0 | 0 | 0 | 1 | Alternative EFTA multislot class 1 |
| 0 | 0 | 1 | 0 | Alternative EFTA multislot class 1 |
| 0 | 0 | 1 | 1 | Alternative EFTA multislot class 1 |

TABLE 16-continued

Example field to be included in Table 10.5.146/3GPP TS 24.008
Alternative EFTA multislot class (4 bit field)
The presence of the Alternative EFTA multislot class field indicates that
the mobile station supports Enhanced Flexible Timeslot Assignment,
EFTA, (see 3GPP TS 45.002 [32]). This field shall be ignored if the
High Multislot Capability field is not present. The Alternative EFTA
multislot class field is used together with the (DTM) EGPRS (high)
multislot class to determine the mobile stations capabilities when using
Enhanced Flexible Timeslot Assignment, EFTA, and is coded as follows:

| Bit | | | | |
|---|---|---|---|---|
| 4 | 3 | 2 | 1 | |
| 0 | 1 | 0 | 0 | Alternative EFTA multislot class 1 |
| 0 | 1 | 0 | 1 | Alternative EFTA multislot class 1 |
| 0 | 1 | 1 | 0 | Alternative EFTA multislot class 3 |
| 0 | 1 | 1 | 1 | Alternative EFTA multislot class 3 |
| 1 | 0 | 0 | 0 | Alternative EFTA multislot class 3 |
| 1 | 0 | 0 | 1 | Alternative EFTA multislot class 3 |
| 1 | 0 | 1 | 0 | Alternative EFTA multislot class 3 |
| 1 | 0 | 1 | 1 | Alternative EFTA multislot class 3 |
| 1 | 1 | 0 | 0 | Alternative EFTA multislot class 2 |
| 1 | 1 | 0 | 1 | Unused. If received, it shall be interpreted as '0000' |
| 1 | 1 | 1 | 0 | Unused. If received, it shall be interpreted as '0000' |
| 1 | 1 | 1 | 1 | Unused. If received, it shall be interpreted as '0000' |

It is noted that a method of a wireless network for deriving multislot capability parameters of a mobile station transmitting and receiving data in uplink and downlink timeslots of a TDMA timeframe may comprise determining a signaled class of the mobile station, determining whether the mobile station indicates support of one of a plurality alternative classes in addition to the signaled class, and assigning Rx, Tx, SUM, Tta, Ttb, Tra and Trb of the signaled class as Rx, Tx, SUM, Tta, Ttb, Tra and Trb, respectively, of the mobile station when the mobile station indicates no alternative class, and wherein Rx is a maximum number of receive timeslots the mobile station can use in the TDMA timeframe, Tx is a maximum number of transmit timeslots the mobile station can use in the TDMA timeframe, SUM is a total number of uplink and downlink timeslots that can be used by the mobile station in the TDMA timeframe, Tta is time needed for the mobile station to perform measurement and get ready to transmit, Ttb is the time needed for the mobile station to get ready to transmit, Tra is the time needed for the mobile station to perform measurement and get ready to receive, and Trb is the time needed for the mobile station to get ready to receive.

When the mobile station indicates the support of the one of the plurality of alternative classes, the method includes assigning Rx and Tx of the one alternative class as Rx and Tx, respectively, of the mobile station, determining whether the mobile station is in a receive-only mode, and determining whether the mobile station is assigned a number of downlink timeslots higher than the Rx value of the signaled class.

When the mobile station is determined to be in the receive-only mode and when the assigned number of downlink timeslots is higher than the Rx value of the signaled class, the method further includes assigning Trb and Tra of the one alternative class as Trb and Tra, respectively, of the mobile station, and wherein the SUM, Tta and Ttb parameters of the mobile station are not applicable.

When the mobile station is not determined to be in the receive-only mode or when the assigned number of downlink timeslots is not higher than the RX value of the signaled class, the method further includes assigning SUM, Tta, Ttb, Tra and Trb of the signaled class as SUM, Tta, Ttb, Tra and Trb, respectively, of the mobile station.

The mobile station of the method above supports Enhanced Flexible Timeslot Assignment (EFTA) and the signaled class comprises one of multislot classes 30-35.

The mobile station of the method above indicates a plurality of alternative classes that includes new alternative multislot class 1 with Rx=6, Tra=1, and Trb=1 with frequency hopping or Trb=0 without frequency hopping, new alternative multislot class 2 with Rx=7, Tra=1, and Trb=1 with frequency hopping or Trb=0 without frequency hopping, and new alternative multislot class 3 with Rx=8, Tra=1, and Trb=1 with frequency hopping or Trb=0 without frequency hopping.

The mobile station of the method above indicates a plurality of alternative classes that includes alternative classes 19-29 as defined in 3GPP TS 45.002 6.4.2.2 Annex B.1.

The method above may be performed by accessing a non-transitory computer readable medium having computer-readable instructions stored thereon for execution on a network device.

The systems and methods described above may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via network 20. Such a computer-readable memory and a computer data signal are also within the scope of the present disclosure, as well as the hardware, software and the combination thereof.

Other embodiments will be apparent to those skilled in the art from consideration of the specification and practice of the subject matter disclosed herein. It is intended that the specification and examples be considered as exemplary only, with a true scope and spirit of the invention being indicated by the following claims.

What is claimed is:

1. A method of a wireless network, comprising,
    determining a signaled class of a mobile station operating in a network utilizing TDMA;
    determining whether the mobile station supports an alternative class in addition to the signaled class; and
    determining multislot capability parameters of the mobile station based on whether the mobile station supports the alternative class, wherein determining the multislot capability parameters includes:
        if the mobile station does not support the alternative class, applying Tx of the signaled class as Tx of the mobile station, and applying Rx of the signaled class as Rx of the mobile station; and
        if the mobile station supports the alternative class, applying Tx of the signaled class as Tx of the mobile station, and applying Rx of the alternative class as Rx of the mobile station,
    wherein Tx is a maximum number of transmit timeslots the mobile station can use in a TDMA timeframe and Rx is a maximum number of receive timeslots the mobile station can use in the TDMA timeframe.

2. The method of claim 1, wherein the mobile station supports Enhanced Flexible Timeslot Assignment (EFTA) and the signaled class comprises one of multislot classes 30-39.

3. The method of claim 2, wherein when the mobile station supports no alternative class, determining the multislot capability parameters further comprises,
applying Tta and Tra of the signaled class as Tta and Tra, respectively, of the mobile station; and
applying Ttb and Trb of multislot classes 19-29 as Ttb and Trb, respectively, of the mobile station,
wherein Tta is a time needed for the mobile station to perform measurement and get ready to transmit, Ttb is a time needed for the mobile station to get ready to transmit, Tra is a time needed for the mobile station to perform measurement and get ready to receive, and Trb is a time needed for the mobile station to get ready to receive.

4. The method of claim 2, wherein when the mobile station supports the alternative class, determining the multislot capability parameters further comprises,
applying Tta and Tra of the signaled class as Tta and Tra, respectively, of the mobile station; and
applying Ttb and Trb of the alternative class as Ttb and Trb, respectively, of the mobile station,
wherein Tta is a time needed for the mobile station to perform measurement and get ready to transmit, Ttb is a time needed for the mobile station to get ready to transmit, Tra is a time needed for the mobile station to perform measurement and get ready to receive, and Trb is a time needed for the mobile station to get ready to receive.

5. The method of claim 1, wherein when the signaled class of the mobile station is determined to be one of multislot classes 40-45 and when the mobile station supports no alternative class, determining the multislot capability parameters further comprises,
applying Tta, Trb and Tra of the signaled class as Tta, Trb and Tra, respectively, of the mobile station; and
applying Ttb of multislot classes 19-29 as Ttb of the mobile station, wherein Tta is a time needed for the mobile station to perform measurement and get ready to transmit, Ttb is a time needed for the mobile station to get ready to transmit, Tra is a time needed for the mobile station to perform measurement and get ready to receive, and Trb is a time needed for the mobile station to get ready to receive.

6. The method of claim 1, wherein when the signaled class of the mobile station is determined to be one of multislot classes 40-45 and when the mobile station supports the alternative class, determining the multislot capability parameters further comprises,
applying Tta, Trb and Tra of the signaled class as Tta, Trb and Tra, respectively, of the mobile station; and
applying Ttb of the alternative class as Ttb of the mobile station,
wherein Tta is a time needed for the mobile station to perform measurement and get ready to transmit, Ttb is a time needed for the mobile station to get ready to transmit, Tra is a time needed for the mobile station to perform measurement and get ready to receive, and Trb is a time needed for the mobile station to get ready to receive.

7. A network device for wireless communications, the network device comprising:
a processor; and
a memory for storing instructions which, when executed, cause the processor to:
determine a signaled class of a mobile station operating in a network utilizing TDMA;
determine whether the mobile station supports an alternative class in addition to the signaled class; and
determine multislot capability parameters of the mobile station based on whether the mobile station supports the alternative class, wherein determining the multislot capability parameters includes:
if the mobile station does not support the alternative class, applying Tx of the signaled class as Tx of the mobile station, and applying Rx of the signaled class as Rx of the mobile station; and
if the mobile station supports the alternative class, applying Tx of the signaled class as Tx of the mobile station, and applying Rx of the alternative class as Rx of the mobile station,
wherein Tx is a maximum number of transmit timeslots the mobile station can use in a TDMA timeframe and Rx is a maximum number of receive timeslots the mobile station can use in the TDMA timeframe.

8. A non-transitory computer readable medium having computer-readable instructions stored thereon for execution on a network device, the instructions causing the network device to:
determine a signaled class of a mobile station operating in a network utilizing TDMA;
determine whether the mobile station supports an alternative class in addition to the signaled class; and
determine multislot capability parameters of the mobile station based on whether the mobile station supports the alternative class, wherein determining the multislot capability parameters includes:
if the mobile station does not support the alternative class, applying Tx of the signaled class as Tx of the mobile station, and applying Rx of the signaled class as Rx of the mobile station; and
if the mobile station supports the alternative class, applying Tx of the signaled class as Tx of the mobile station, and applying Rx of the alternative class as Rx of the mobile station, wherein Tx is a maximum number of transmit timeslots the mobile station can use in a TDMA timeframe and Rx is a maximum number of receive timeslots the mobile station can use in the TDMA timeframe.

9. A method of a mobile station, comprising:
transmitting information of a signaled multislot class of the mobile station;
transmitting, when available, information of an alternative multislot class of the mobile station;
receiving an assignment of a multislot configuration;
determining, by the mobile station, multislot capability parameters during a radio block period based on at least whether the information of the alternative multislot class is available and whether the mobile station is transmitting in the radio block period; and
operating the mobile station based on the assignment and on the multislot capability parameters,
wherein when the mobile station does not transmit the information of the alternative multislot class, the multislot capability parameters comprise Rx, Tx, SUM, Tta, Ttb, Tra and Trb of the signaled multislot class,
wherein when the mobile station transmits the information of the alternative multislot class, the multislot capability parameters comprise Rx of the alternative multislot class and Tx of the signaled multislot class,
and wherein Rx is a maximum number of receive timeslots the mobile station can use in a TDMA timeframe, Tx is a maximum number of transmit timeslots the mobile station can use in the TDMA timeframe, SUM is a total number of uplink and downlink timeslots that can be used by the mobile station in the TDMA timeframe, Tta is a time needed for the mobile station to perform measurement and get ready to transmit, Ttb is a time needed for the mobile station to get ready to transmit, Tra is a time needed for the mobile station to perform measurement and get ready to receive, and Trb is a time needed for the mobile station to get ready to receive.

10. The method of claim 9, wherein when the mobile station transmits the information of the alternative multislot class, the method further comprises:
   operating in a receive-only mode; and
   determining whether an assigned number of downlink timeslots is higher than the Rx of the signaled multislot class.

11. The method of claim 10, wherein when the mobile station is operating in a receive-only mode and when the assigned number of downlink timeslots is higher than the Rx of the signaled multislot class, the multislot capability parameters further comprise Trb and Tra of the alternative multislot class, and further wherein the SUM, Tta and Ttb parameters are not applicable.

12. The method of claim 10, wherein when the mobile station is not operating in a receive-only mode or when the assigned number of downlink timeslots is not higher than the Rx of the signaled multislot class, the multislot capability parameters further comprise SUM, Tta, Ttb, Tra and Trb of the signaled multislot class.

13. The method of claim 9, wherein the alternative multislot class comprises one of the following classes:
   alternative multislot class 1 with Rx=6, Tra=1, and Trb=1 with frequency hopping or Trb=0 without frequency hopping;
   alternative multislot class 2 with Rx=7, Tra=1, and Trb=1 with frequency hopping or Trb=0 without frequency hopping; or
   alternative multislot class 3 with Rx=8, Tra=1, and Trb=1 with frequency hopping or Trb=0 without frequency hopping.

14. A non-transitory computer readable medium having computer-readable instructions stored thereon for execution on a mobile station, the instructions causing the mobile station to:
   transmit information of a signaled multislot class of the mobile station;
   transmit, when available, information of an alternative multislot class of the mobile station;
   receive an assignment of a multislot configuration;
   determine, by the mobile station, multislot capability parameters during a radio block period based on at least whether the information of the alternative multislot class is available and whether the mobile station is transmitting in the radio block period; and
   operate the mobile station based on the assignment and on the multislot capability parameters,
   wherein when the mobile station does not transmit the information of the alternative multislot class, the multislot capability parameters comprise Rx, Tx, SUM, Tta, Ttb, Tra and Trb of the signaled multislot class,
   wherein when the mobile station transmits the information of the alternative multislot class, the multislot capability parameters comprise Rx of the alternative multislot class and Tx of the signaled multislot class, and wherein Rx is a maximum number of receive timeslots the mobile station can use in a TDMA timeframe, Tx is a maximum number of transmit timeslots the mobile station can use in the TDMA timeframe, SUM is a total number of uplink and downlink timeslots that can be used by the mobile station in the TDMA timeframe, Tta is a time needed for the mobile station to perform measurement and get ready to transmit, Ttb is a time needed for the mobile station to get ready to transmit, Tra is a time needed for the mobile station to perform measurement and get ready to receive, and Trb is a time needed for the mobile station to get ready to receive.

15. The computer readable medium of claim 14, wherein when the mobile station transmits the information of the alternative multislot class, the instructions cause the mobile station further to:
   operate in a receive-only mode; and
   determine whether an assigned number of downlink timeslots is higher than the Rx of the signaled multislot class.

16. The computer readable medium of claim 15, wherein when the mobile station is not operating in a receive-only mode or when the assigned number of downlink timeslots is not higher than the Rx of the signaled multislot class, the multislot capability parameters further comprise SUM, Tta, Ttb, Tra and Trb of the signaled multislot class.

17. The computer readable medium of claim 14, wherein the alternative multislot class comprises one of the following classes:
   alternative multislot class 1 with Rx=6, Tra=1, and Trb=1 with frequency hopping or Trb=0 without frequency hopping;
   alternative multislot class 2 with Rx=7, Tra=1, and Trb=1 with frequency hopping or Trb=0 without frequency hopping; or
   alternative multislot class 3 with Rx=8, Tra=1, and Trb=1 with frequency hopping or Trb=0 without frequency hopping.

18. A mobile station for operating in a wireless network, the mobile station comprising:
   a processor; and
   a memory for storing instructions which, when executed, cause the mobile station to:
   transmit information of a signaled multislot class of the mobile station;
   transmit, when available, information of an alternative multislot class of the mobile station;
   receive an assignment of a multislot configuration;
   determine, by the mobile station, multislot capability parameters during a radio block period based on at least whether the information of the alternative multislot class is available and whether the mobile station is transmitting in the radio block period; and
   operate the mobile station based on the assignment and on the multislot capability parameters,
   wherein when the mobile station does not transmit the information of the alternative multislot class, the multislot capability parameters comprise Rx, Tx, SUM, Tta, Ttb, Tra and Trb of the signaled multislot class,
   wherein when the mobile station transmits the information of the alternative multislot class, the multislot capability parameters comprise Rx of the alternative multislot class and Tx of the signaled multislot class, and wherein Rx is a maximum number of receive timeslots the mobile station can use in a TDMA timeframe, Tx is a maximum number of transmit timeslots the mobile station can use in the TDMA timeframe, SUM is a total number of uplink and downlink timeslots that can be used by the mobile station in the TDMA timeframe, Tta is a time needed for the mobile station to perform measurement and get ready to transmit, Ttb is a time needed for the mobile station to get ready to transmit, Tra is a time needed for the mobile station to perform measurement and get ready to receive, and Trb is a time needed for the mobile station to get ready to receive.

19. The mobile station of claim 18, wherein when the mobile station transmits the information of the alternative multislot class, the instructions cause the mobile station further to:
   operate in a receive-only mode; and
   determine whether an assigned number of downlink timeslots is higher than the Rx of the signaled multislot class.

20. The mobile station of claim 18, wherein the alternative multislot class comprises one of the following classes:
   alternative multislot class 1 with Rx=6, Tra=1, and Trb=1 with frequency hopping or Trb=0 without frequency hopping;
   alternative multislot class 2 with Rx=7, Tra=1, and Trb=1 with frequency hopping or Trb=0 without frequency hopping; or
   alternative multislot class 3 with Rx=8, Tra=1, and Trb=1 with frequency hopping or Trb=0 without frequency hopping.

* * * * *